(12) United States Patent
Yasuda

(10) Patent No.: US 11,429,327 B2
(45) Date of Patent: Aug. 30, 2022

(54) COMPUTER SYSTEM, LOGIN SCREEN DISPLAY METHOD, AND STORAGE MEDIUM FOR DISPLAYING AN APPROPRIATE LOGIN SCREEN

(71) Applicant: Tohta Yasuda, Kanagawa (JP)

(72) Inventor: Tohta Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/011,237

(22) Filed: Sep. 3, 2020

(65) Prior Publication Data

US 2021/0081154 A1 Mar. 18, 2021

(30) Foreign Application Priority Data

Sep. 13, 2019 (JP) .............................. JP2019-167610

(51) Int. Cl.
*G06F 3/12* (2006.01)
*G06F 21/31* (2013.01)
*G06F 21/60* (2013.01)

(52) U.S. Cl.
CPC .......... *G06F 3/1238* (2013.01); *G06F 3/1203* (2013.01); *G06F 21/31* (2013.01); *G06F 21/608* (2013.01)

(58) Field of Classification Search
CPC ...... G06F 3/1238; G06F 3/1203; G06F 21/31; G06F 21/608; G06F 2221/2139; G06F 21/30; H04L 2463/082; H04L 63/08
See application file for complete search history.

(56) References Cited

U.S. PATENT DOCUMENTS

| | | | |
|---|---|---|---|
| 9,661,184 B2 | 5/2017 | Ogawa | |
| 10,698,701 B1* | 6/2020 | De Jong | G06F 21/31 |
| 2004/0158743 A1* | 8/2004 | Ham | G06F 21/41 |
| | | | 713/183 |
| 2004/0168092 A1* | 8/2004 | Adachi | G06F 21/31 |
| | | | 726/6 |
| 2009/0055923 A1* | 2/2009 | Huang | G06F 21/32 |
| | | | 726/18 |
| 2012/0171999 A1* | 7/2012 | Im | H04W 12/06 |
| | | | 455/411 |
| 2015/0128231 A1* | 5/2015 | Nakajima | G06F 21/31 |
| | | | 726/5 |
| 2016/0065541 A1 | 3/2016 | Winner et al. | |
| 2017/0366525 A1* | 12/2017 | Takagi | G06F 21/32 |
| 2018/0165442 A1* | 6/2018 | Liu | G06F 21/36 |
| 2019/0034621 A1* | 1/2019 | Mondello | G06F 21/44 |
| 2019/0286401 A1 | 9/2019 | Yasuda et al. | |

FOREIGN PATENT DOCUMENTS

| | | |
|---|---|---|
| JP | 6375877 | 8/2018 |
| WO | 2016/130168 | 8/2016 |

OTHER PUBLICATIONS

Extended European Search Report for 20194855.1 dated Jan. 22, 2021.

* cited by examiner

*Primary Examiner* — Juan M Guillermety

(74) *Attorney, Agent, or Firm* — IPUSA, PLLC

(57) ABSTRACT

A computer system includes an information processing system configured to authenticate a user using one of multiple login methods and a terminal configured to request the information processing system to authenticate the user. The terminal includes a processor programmed to determine a login method based on a previously-used login method and display a login screen corresponding to the determined login method.

18 Claims, 35 Drawing Sheets

FIG.6

WEB SERVICE | ::: Tenant info  ⓘ ✱ ⓘ  user01  TENANT ID: 0123456789

↳Top

TENANT INFORMATION

| BASIC SETTINGS | LOGIN METHODS TO BE USED |
| LOGIN SETTING | ☐ ALL |
| | ☑ EMAIL ADDRESS + PASSWORD |
| | ☐ TENANT ID + USER ID + PASSWORD |
| | ☐ EXTERNAL SERVICE |
| | 401 |
| | SAVE |

400

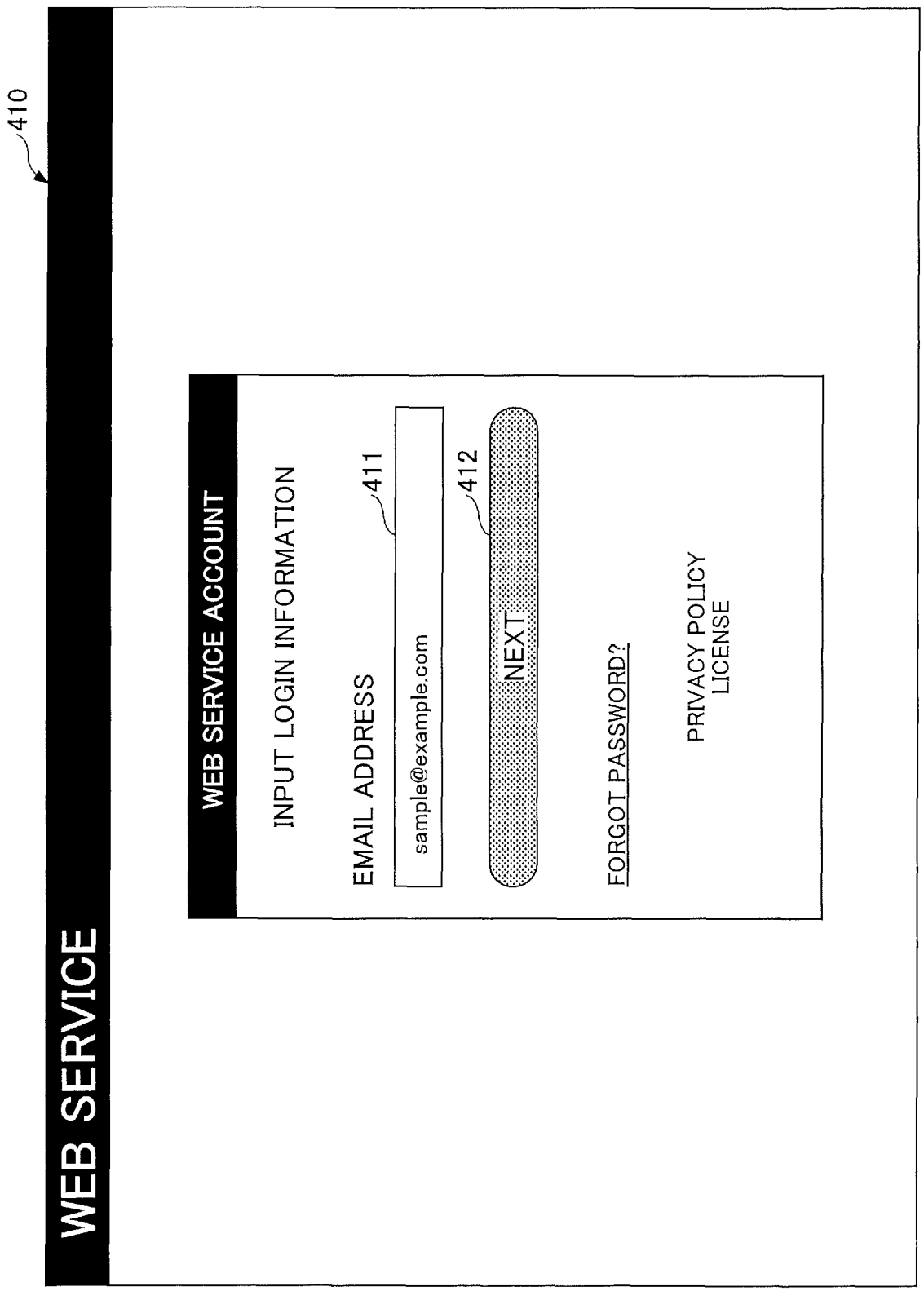

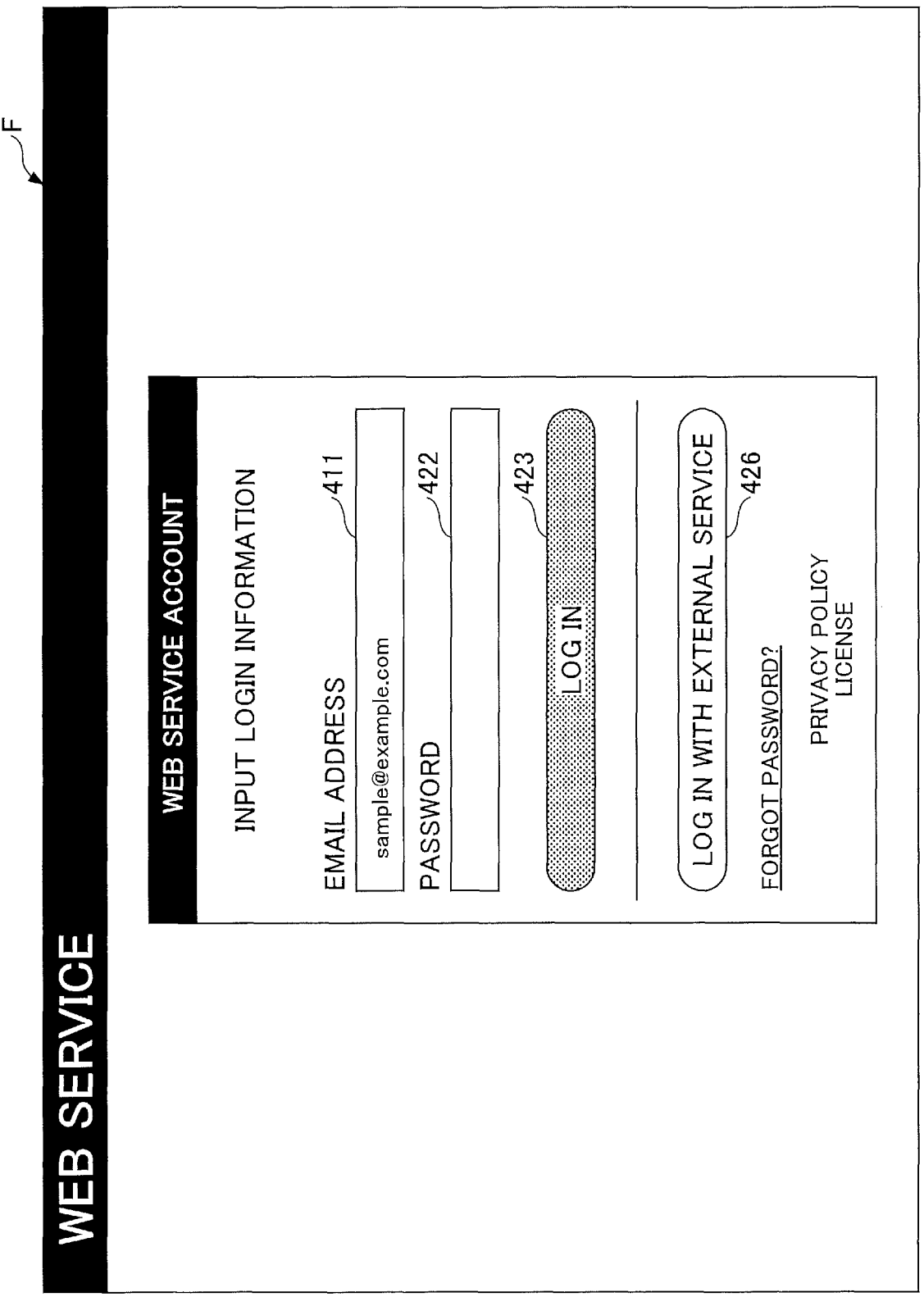

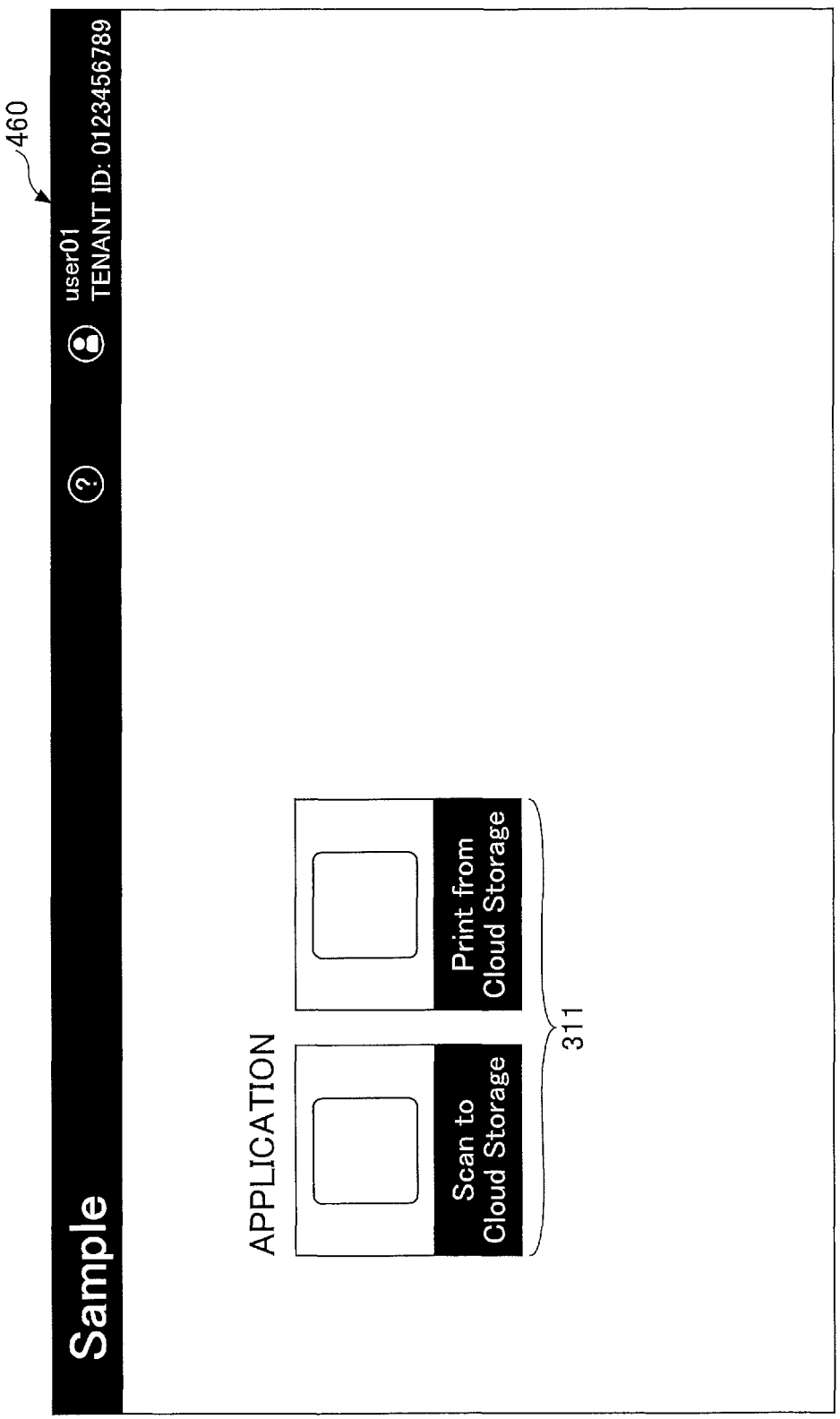

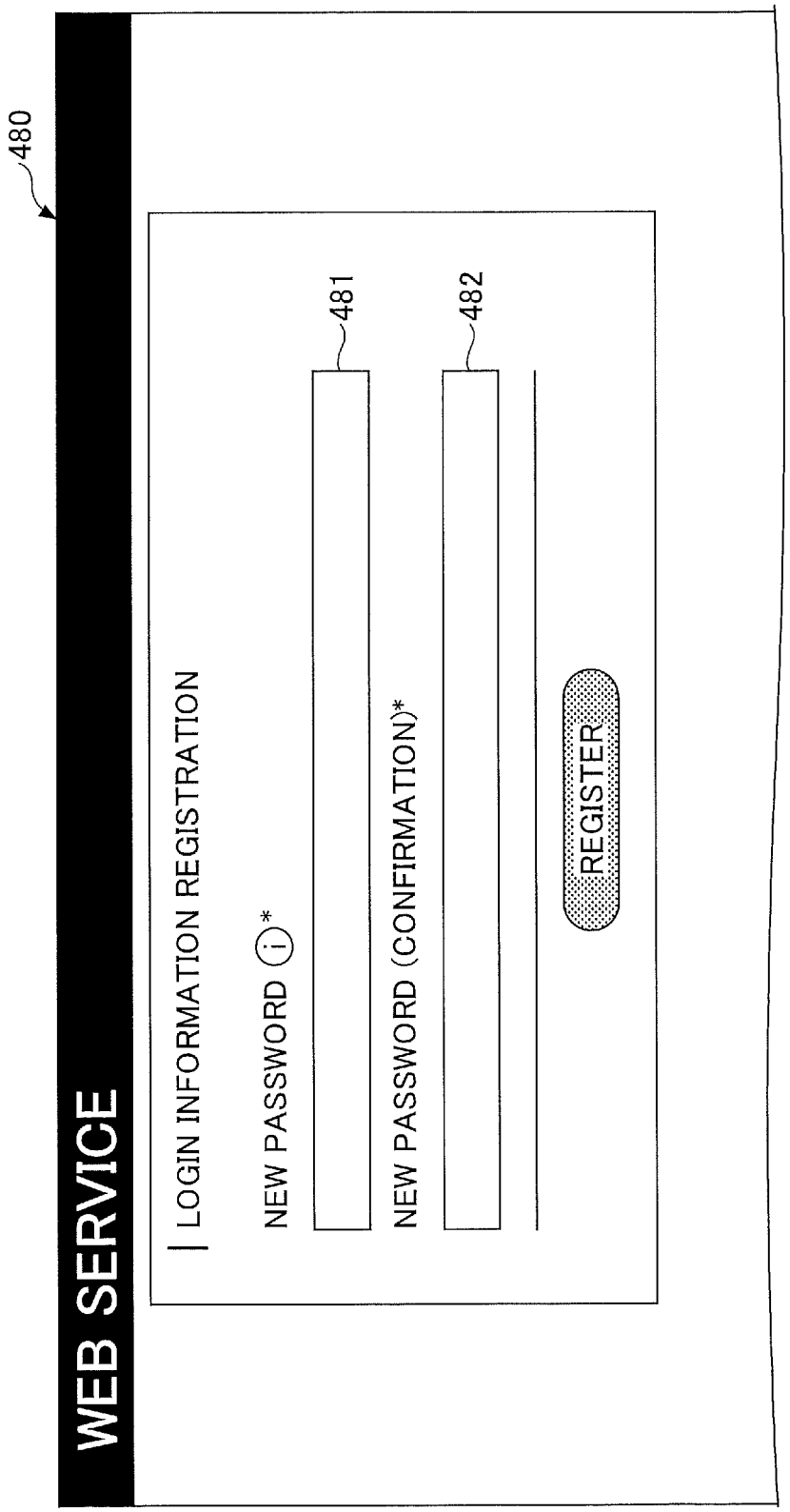

COMPUTER SYSTEM, LOGIN SCREEN DISPLAY METHOD, AND STORAGE MEDIUM FOR DISPLAYING AN APPROPRIATE LOGIN SCREEN

CROSS-REFERENCE TO RELATED APPLICATION

The present application claims priority under 35 U.S.C. § 119 to Japanese Patent Application No. 2019-167610, filed on Sep. 13, 2019, the contents of which are incorporated herein by reference in their entirety.

BACKGROUND OF THE INVENTION

1. Field of the Invention

An aspect of this disclosure relates to a computer system, a login screen display method, and a storage medium.

2. Description of the Related Art

A known information processing system provides software to a user via a network. The user can use services provided by the information processing system from a client terminal by preparing a certain environment including the client terminal such as a personal computer (PC), a web browser running on the client terminal, and an Internet connection environment.

There is a case where organizations such as companies subscribe to services provided by such an information processing system, and members of the organizations use the services as users. The organizations subscribing to the services of the information processing system are managed in units called tenants. To use the services permitted for the tenants, the users log into the information processing system.

Japanese Patent No. 6375877, for example, discloses a technology for simplifying login operations of a user in consideration of the convenience of the user. Specifically, Japanese Patent No. 6375877 discloses a login method that enables a user to log in by simply selecting the user from a user list and then entering a password instead of entering an email address and a password.

However, with the related-art technology, when an information processing system provides multiple login methods, an appropriate login screen cannot be displayed unless the user is identified each time the user logs in.

SUMMARY OF THE INVENTION

According to an aspect of this disclosure, there is provided a computer system that includes an information processing system configured to authenticate a user using one of multiple login methods and a terminal configured to request the information processing system to authenticate the user. The terminal includes a processor programmed to determine a login method based on a previously-used login method and display a login screen corresponding to the determined login method.

BRIEF DESCRIPTION OF THE DRAWINGS

FIG. 6 is a drawing illustrating an example of a login method setting screen;

FIG. 8 is a drawing illustrating an example of an email address input screen;

FIG. 16 is a drawing illustrating an example of a login screen F;

FIG. 18A is a drawing illustrating an example of a top screen;

FIG. 27 is a drawing illustrating an example of a password setting screen; and

DESCRIPTION OF THE EMBODIMENTS

An aspect of this disclosure makes it possible to provide a computer system that can display an appropriate login screen without identifying a user.

A computer system and a login screen display method performed by the computer system according to embodiments of the present invention are described below.

First Embodiment

Outline of Operation

In the present embodiment, it is assumed that organizations such as companies subscribe to services provided by an information processing system and members of the organizations use the services as users. The organizations subscribing to the services are managed in units called tenants. The users of the services are, for example, employees of companies, and each user belongs to one or more tenants. Users who can execute the subscribed services are set by, for example, an administrator, and available services are determined for each user. When a user logs into the information processing system, a portal screen including a list of services available to the user is displayed on a terminal of the user. The services are provided as web applications, and application icons corresponding to the services are displayed on the portal screen.

For example, a service processes vouchers according to a predetermined procedure to reduce the workload of the user. Here, "workflow" indicates automatic execution of one or more processes on electronic data in a predetermined order. Also, because a portal screen for the user's work is displayed when the user logs in, the service provided by the information processing system may be referred to as a workplace.

Figure 1:
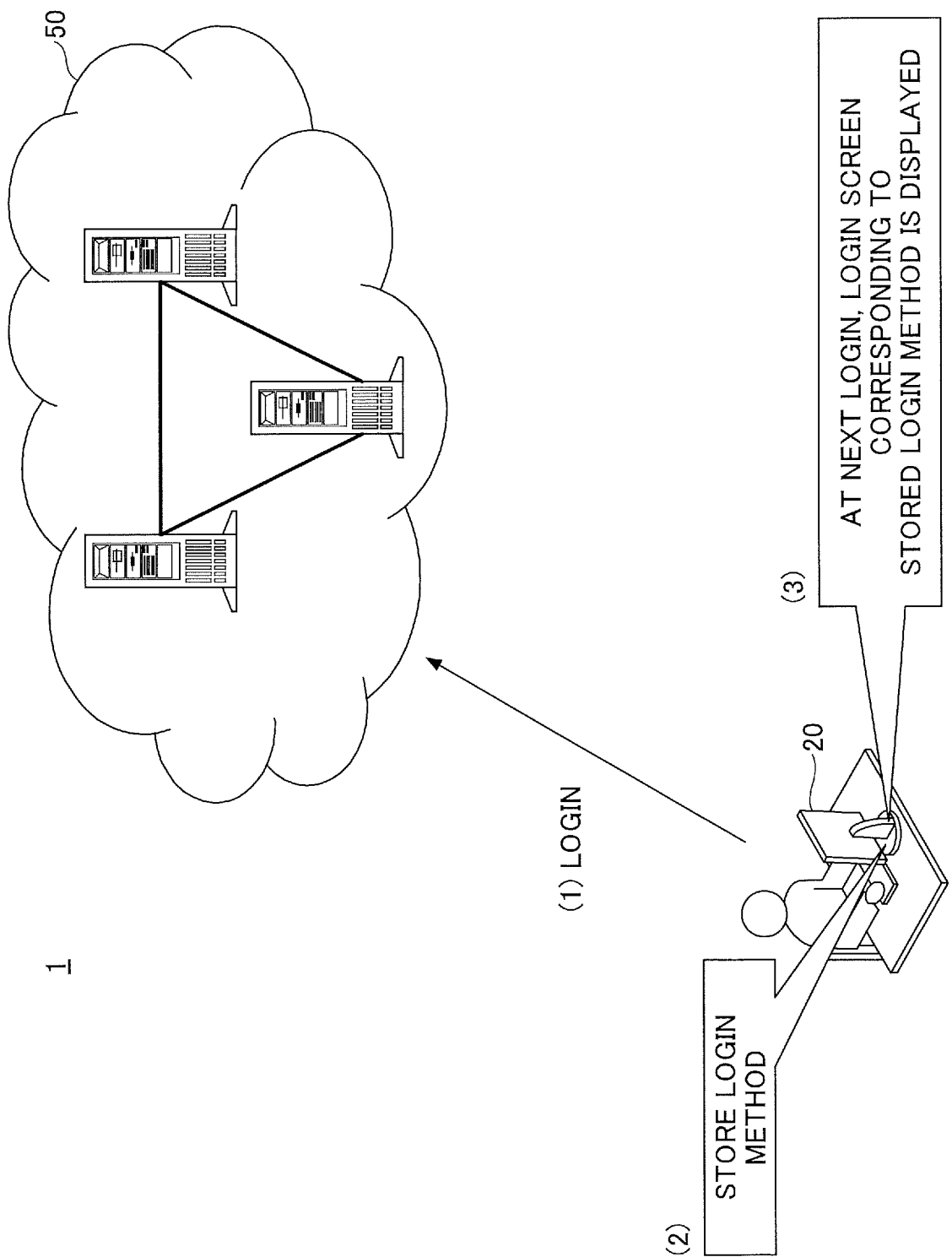
FIG. 1 is a drawing illustrating the outline of a process where a user logs into a computer system.

First, the outline of an operation performed by a computer system is described with reference to FIG. 1. FIG. 1 is a drawing illustrating the outline of a process where a user logs into a computer system 1.

(1) The user logs into an information processing system 50 using a first terminal 20. When the user logs into the information processing system 50 for the first time, the user inputs account information on a login screen corresponding to a login method permitted by a tenant.

(2) When authentication is successful, the first terminal 20 stores the login method used by the user.

Examples of login methods are as follows.

(A) Email address and password
(B) Tenant ID, user ID, and password
(C) Using external service
(D) All (3) From the next time onward, when the user logs into the information processing system 50, the first terminal 20 displays a login screen corresponding to the stored login method.

Therefore, once the login method is stored, the first terminal 20 can display the login screen corresponding to the login method permitted by the tenant without requiring the user to input identification information such as an email address for identifying or specifying the user. For example, if the user has once logged in with the login method "(C) Using external service", because an external service 70 does not require an email address for authentication (a login screen corresponding to the login method using the external service does not request an email address), the occasions where the information processing system 50 unnecessarily requests the user to input an email address can be reduced.

Terminology

A tenant indicates a group of customers who share the same software. In other words, a tenant indicates a group of users who have use rights of multiple software instances existing in the system.

The information processing system 50 may be implemented by one or more information processing apparatuses. The information processing apparatus may also be referred to as a server. The information processing apparatus is normally placed on the Internet. However, the information processing apparatus may be placed in a local network (inside of the firewall) of, for example, a company. One or more information processing apparatuses may be referred to as a cloud system. A cloud system is a system that uses cloud computing, and cloud computing is a technology where resources on a network are used without being aware of specific hardware resources. In general, a cloud system indicates an information processing system on the Internet. However, a cloud system may also be provided on a local network.

Example of System Configuration

Figure 2:
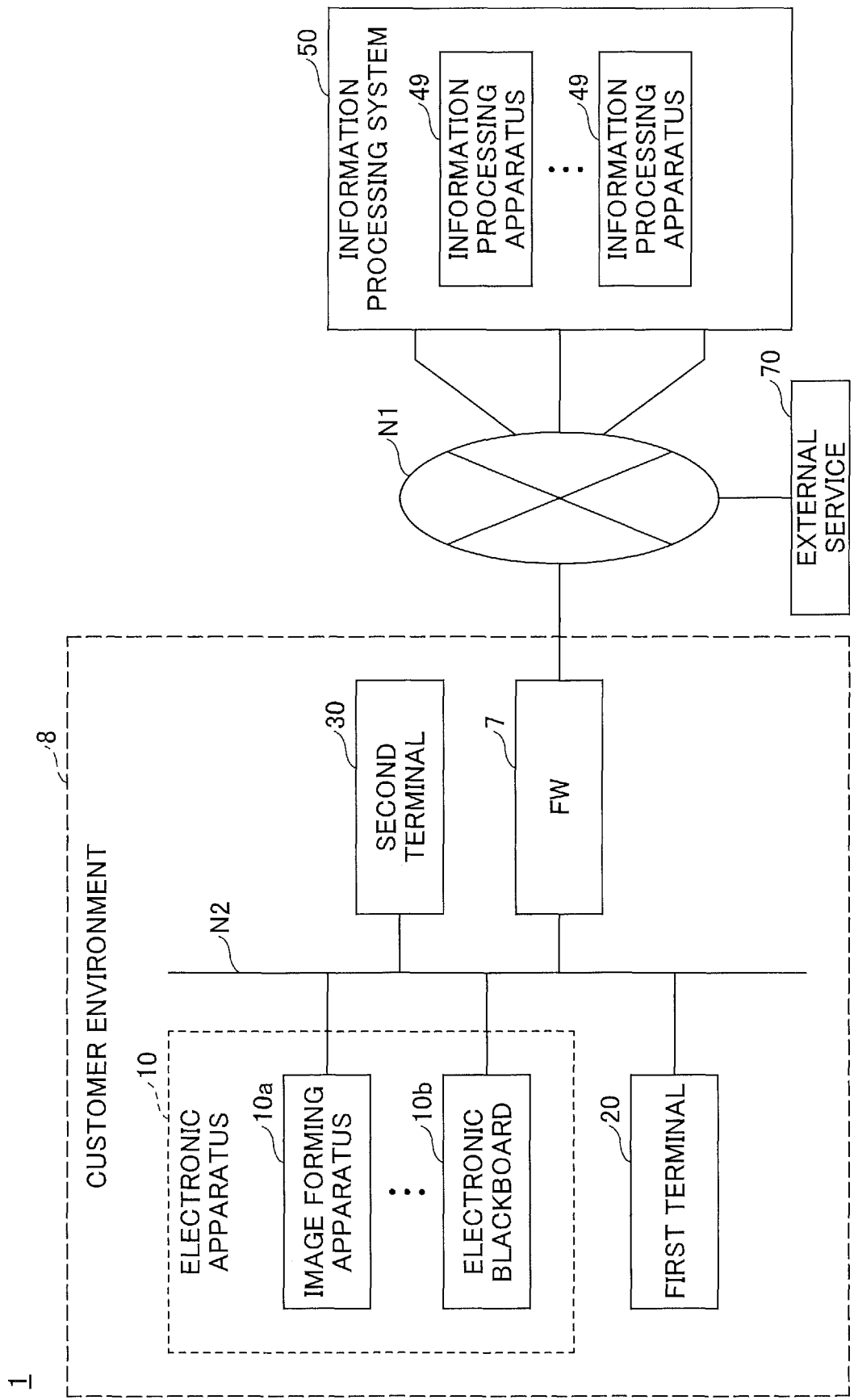
FIG. 2 is a block diagram illustrating an example of a configuration of a computer system.

FIG. 2 is a block diagram illustrating an example of a configuration of the computer system 1. In the computer system 1 of FIG. 2, a customer environment 8 is connected to the information processing system 50 via a network N1 such as the Internet. The network N1 may also be a telephone line such as a mobile phone network.

The customer environment 8 is an environment of a customer using services provided by the information processing system 50, and the customer may be an organization such as a company, a group, an educational institution, a government agency, or a department. People who have a certain employment relationship with the customer are referred to users. The users include a general user and an administrator. The customer environment 8 includes one or more electronic apparatuses 10, a first terminal 20, a second terminal 30, and a firewall (FW) 7 that are connected to each other via a network N2 such as a local area network (LAN). Also, the information processing system 50 includes one or more information processing apparatuses 49 connected to the network N1.

An image forming apparatus 10a is an example of the electronic apparatus 10. The image forming apparatus 10a may be, for example, a laser printer, a multifunction printer, or a multifunction peripheral (product or printer). An electronic blackboard 10b is another example of the electronic apparatus 10. Other examples of electronic apparatuses 10 include output devices such as a projector (PJ) and a digital signage, a head-up display (HUD), an industrial machine, an imaging device, a sound collector, a medical device, a network home appliance, an automobile (Connected Car), a notebook PC, a mobile phone, a smartphone, a tablet terminal, a game machine, a personal digital assistant (PDA), a digital camera, a wearable PC, and a desktop PC.

The electronic apparatus 10 of the present embodiment functions as a terminal used by a user registered in the information processing system 50 to use a service. The user logs into the information processing system 50 from the electronic apparatus 10, selects an application (application software) whose use right is assigned to the user, and receives a service provided by the information processing system 50. Thus, services are provided in units of applications.

The first terminal 20 is an information processing apparatus such as a smartphone, a mobile phone, a tablet PC, a desktop PC, or a notebook PC used by a general user. The first terminal 20 includes a program such as a web browser including a screen display function. The program is not limited to a web browser as long as it includes a function to display a screen based on screen information received from the information processing system 50. A program dedicated to the information processing system 50 may also be used for this purpose.

The second terminal 30 is an information processing apparatus such as a smartphone, a mobile phone, a tablet PC, a desktop PC, or a notebook PC used by the administrator. The second terminal 30 includes a program such as a web browser including a screen display function. The program is not limited to a web browser as long as it includes a function to display a screen based on screen information received from the information processing system 50. A program dedicated to the information processing system 50 may also be used for this purpose.

The firewall 7 is an apparatus for preventing intrusion from the outside into the customer environment 8, and all communications from the customer environment 8 are monitored by the firewall 7. However, this does not apply to a case where the first terminal 20 and the second terminal 30 communicate with the information processing system 50 via a telephone line of, for example, a mobile telephone network.

The information processing system 50 provides various services to the electronic apparatuses 10 and the second terminal 30 via the network N1. Services vary depending on the types of electronic apparatuses 10. Examples of services provided for the image forming apparatus 10a include a service for uploading and storing a scanned document in a storage on the cloud and a service for downloading and printing image data in a storage on the cloud. Examples of services provided for the electronic blackboard 10b include a service for creating minutes by voice recognition in real time and a service for converting handwritten data into text. Examples of services provided for the second terminal 30 include a real-time translation service for translating web pages.

In the information processing system 50, tenants and users are associated with each other. Available services (applications) are determined for each user, and the user uses the available applications from the electronic apparatus 10 and the first terminal 20. Tenants, administrators, and users may have the following relationships.

One customer →one tenant (the administrator and users belong to one tenant)

One customer →multiple tenants (the administrator does not necessarily belong to a tenant, and manages tenants and users belonging to the tenants; each user belongs to one or more tenants) In either case, a user registered in the information processing system 50 belongs to at least one tenant. Accordingly, after registration, when the user is identified, the tenant to which the user belongs is also identified.

The information processing system 50 generates screen information of a web page to be displayed by the first terminal 20, the second terminal 30, or the electronic apparatus 10, and sends the screen information to the first terminal 20, the second terminal 30, or the electronic apparatus 10. For example, the information processing system 50 causes the first terminal 20, the second terminal 30, or the electronic apparatus 10 to display a login screen described later.

The screen information is generated using, for example, HTML, XML, cascade style sheet (CSS), and/or JavaScript (registered trademark). A web page may be provided by a web application. A web application refers to software or a mechanism that runs on a web browser and implemented by a cooperation between a program written in a programming language (for example, JavaScript (registered trademark)) running on the web browser and a program on a web server. A web page can be changed dynamically by a web application.

The external service 70 is implemented by one or more information processing apparatuses and mainly provides an authentication linkage service. For example, the external service 70 provides an authentication linkage service such as OAUTH, OAUTH 2.0, or OpenID Connect. The authentication linkage service is a mechanism that enables a user of a service to permit an application of a third party to access data of the user hosted on the service without giving account information (an ID and a password) of the user to the application of the third party. Examples of known authentication linkage services include Office365 (registered trademark), Google (registered trademark), and Facebook (registered trademark).

The configuration of the computer system 1 illustrated in FIG. 2 is just an example, and one or more servers (such as a proxy server and a gateway server) may be provided between the customer environment 8 and the information processing system 50. Further, the first terminal 20 and the second terminal 30 may be provided outside of the customer environment 8 and may be connected to, for example, the network N1.

The information processing system 50 may be implemented by one information processing apparatus 49, or may be distributed to multiple information processing apparatuses 49. For example, an information processing apparatus 49 may be provided for each service, one information processing apparatus 49 may provide multiple services, or multiple information processing apparatuses 49 may provide one service.

In the computer system 1 of FIG. 2, the information processing system 50 is connected to the network N1 such as the Internet outside of the customer environment 8. In other words, in the example of the computer system 1 of FIG. 2, the information processing system 50 is provided in a cloud environment. However, the information processing system 50 may be provided inside of the customer environment 8 (on-premises environment).

Example of Hardware Configuration

<<Computer>>

Figure 3:
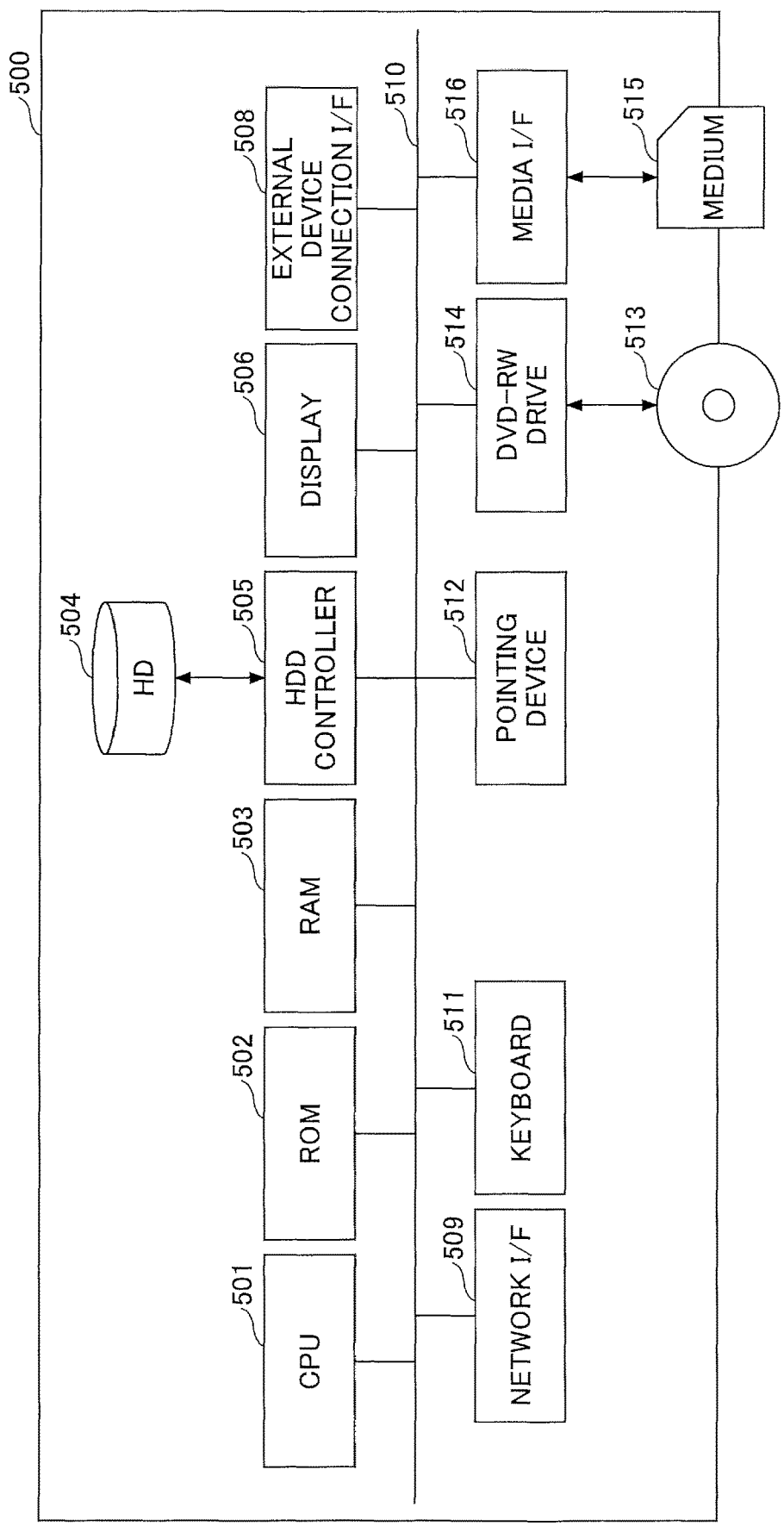
FIG. 3 is a drawing illustrating an example of a hardware configuration of a computer.

Each of the first terminal 20, the second terminal 30, and the information processing apparatus 49 in the information processing system 50 in FIG. 2 is implemented by, for example, a computer having a hardware configuration illustrated in FIG. 3. FIG. 3 is a drawing illustrating an example of a hardware configuration of a computer. As illustrated in FIG. 3, a computer 500 includes a CPU 501, a ROM 502, a RAM 503, an HD 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a media I/F 516.

The CPU 501 controls the operation of the entire computer 500. The ROM 502 stores programs such as an IPL for driving the CPU 501. The RAM 503 is used as a work area for the CPU 501. The HD 504 stores various types of data such as programs. The HDD controller 505 controls reading and writing of data from and to the HD 504 under the control of the CPU 501. The display 506 displays various information items such as a cursor, menus, windows, characters, and images. The external device connection I/F 508 is an interface for connecting various external devices. Examples of external devices include an universal serial bus (USB) memory and a printer. The network I/F 509 is an interface for data communications via the network N1/N2. The bus line 510 is, for example, an address bus or a data bus for electrically connecting the components of the computer 500 illustrated in FIG. 3.

The keyboard 511 is an example of an input unit including multiple keys for inputting characters, numerical values, and various instructions. The pointing device 512 is an example of an input unit for selecting and executing various instructions, selecting an object, and moving a cursor. The DVD-RW drive 514 controls reading and writing of various types of data from and to a DVD-RW 513, which is an example of a removable recording medium. The DVD-RW drive 514 may support not only a DVD-RW but also other recording media such as a DVD-R. The media I/F 516 controls reading and writing (storing) of data from and to a recording medium 515 such as a flash memory.

<<Image Forming Apparatus>>

Figure 4:
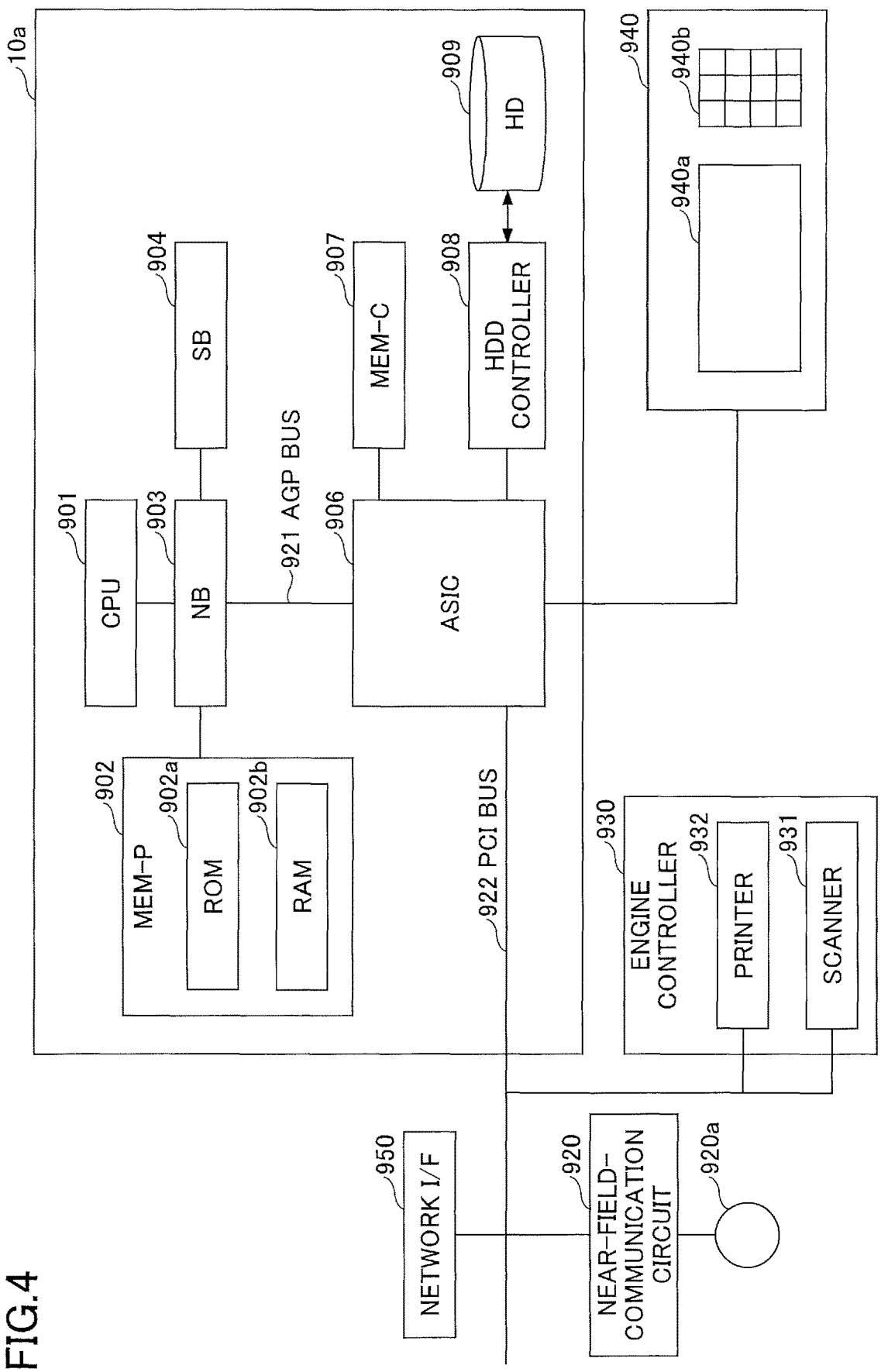
FIG. 4 is a drawing illustrating an example of a hardware configuration of an image forming apparatus.

FIG. 4 is a drawing illustrating an example of a hardware configuration of the image forming apparatus 10a. As illustrated in FIG. 4, the image forming apparatus 10a includes a controller 910, a near-field-communication circuit 920, an engine controller 930, an operations panel 940, and a network I/F 950.

The controller 910 includes a CPU 901 that is a main component of a computer, a system memory (MEM-P) 902, a north bridge (NB) 903, a south bridge (SB) 904, an application specific integrated circuit (ASIC) 906, a local memory (MEM-C) 907 that is a storage, an HDD controller 908, an HD 909 that is a storage, and an accelerated graphics port (AGP) bus 921 connecting the NB 903 to the ASIC 906.

The CPU 901 is a controller that controls the entire image forming apparatus 10a. The NB 903 is a bridge for connecting the CPU 901, the MEM-P 902, the SB 904, and the AGP bus 921 to each other, and includes a memory controller for controlling reading and writing of data from and to the MEM-P 902, a peripheral component interconnect (PCI) master, and an AGP target.

The MEM-P 902 includes a ROM 902a that is a memory for storing programs and data for implementing functions of the controller 910, and a RAM 902b that is used, for example, to load programs and data and as a drawing memory for memory printing. The programs stored in the RAM 902b may be provided as installable or executable files recorded in a computer-readable recording medium such as a CD-ROM, a CD-R, or a DVD.

The SB 904 is a bridge for connecting the NB903 to PCI devices and peripheral devices. The ASIC 906 is an integrated circuit (IC) for image processing and includes hardware components for image processing. The ASIC 906 functions as a bridge that connects the AGP bus 921, the PCI bus 922, the HDD controller 908, and the MEM-C 907 to each other. The ASIC 906 includes a PCI target, an AGP master, an arbiter (ARB) that is the core of the ASIC 906, a memory controller that controls the MEM-C 907, multiple direct memory access controllers (DMAC) that, for example, rotate image data using hardware logic, and a PCI unit that performs data transfer between a scanner 931 and a printer 932 via the PCI bus 922. A universal serial bus (USB) interface and/or an IEEE1394 (Institute of Electrical and Electronics Engineers 1394) interface may be connected to the ASIC 906.

The MEM-C 907 is a local memory used as a copy image buffer and a code buffer. The HD 909 is a storage for storing image data, font data used for printing, and forms. The HDD controller 908 controls reading and writing of data from and to the HD 909 under the control of the CPU 901. The AGP bus 921 is a bus interface for a graphics accelerator card proposed to speed up graphics processing. The AGP bus 921 enables direct access to the MEM-P 902 at high throughput, and can increase the speed of the graphics accelerator card.

The near-field-communication circuit 920 is provided with a near-field-communication circuit antenna 920a. The near-field-communication circuit 920 is, for example, a communication circuit for NFC or Bluetooth (registered trademark).

Further, the engine controller 930 includes the scanner 931 and the printer 932. The operations panel 940 includes a panel display 940a such as a touch panel that displays, for example, current settings and a selection screen and receives inputs from an operator, and hardware keys 940b including a numeric keypad for receiving settings of conditions related to image forming such as density settings and a start key for receiving a copy start instruction. The controller 910 controls the entire image forming apparatus 10a, and controls, for example, drawing, communications, and inputs from the operations panel 940. Each of the scanner 931 and the printer 932 includes an image processor for error diffusion and gamma conversion.

An application switching key of the operations panel 940 enables sequentially switching and selecting a document box function, a copy function, a printer function, and a facsimile function of the image forming apparatus 10a. The image forming apparatus 10a transitions to a document box mode when the document box function is selected, to a copy mode when the copy function is selected, to a printer mode when the printer function is selected, and to a facsimile mode when the facsimile function is selected.

The network I/F 950 is an interface for data communications via the network N1/N2. The near-field-communication circuit 920 and the network I/F 950 are electrically connected to the ASIC 906 via the PCI bus 922.

Functional Configuration

Figure 5:
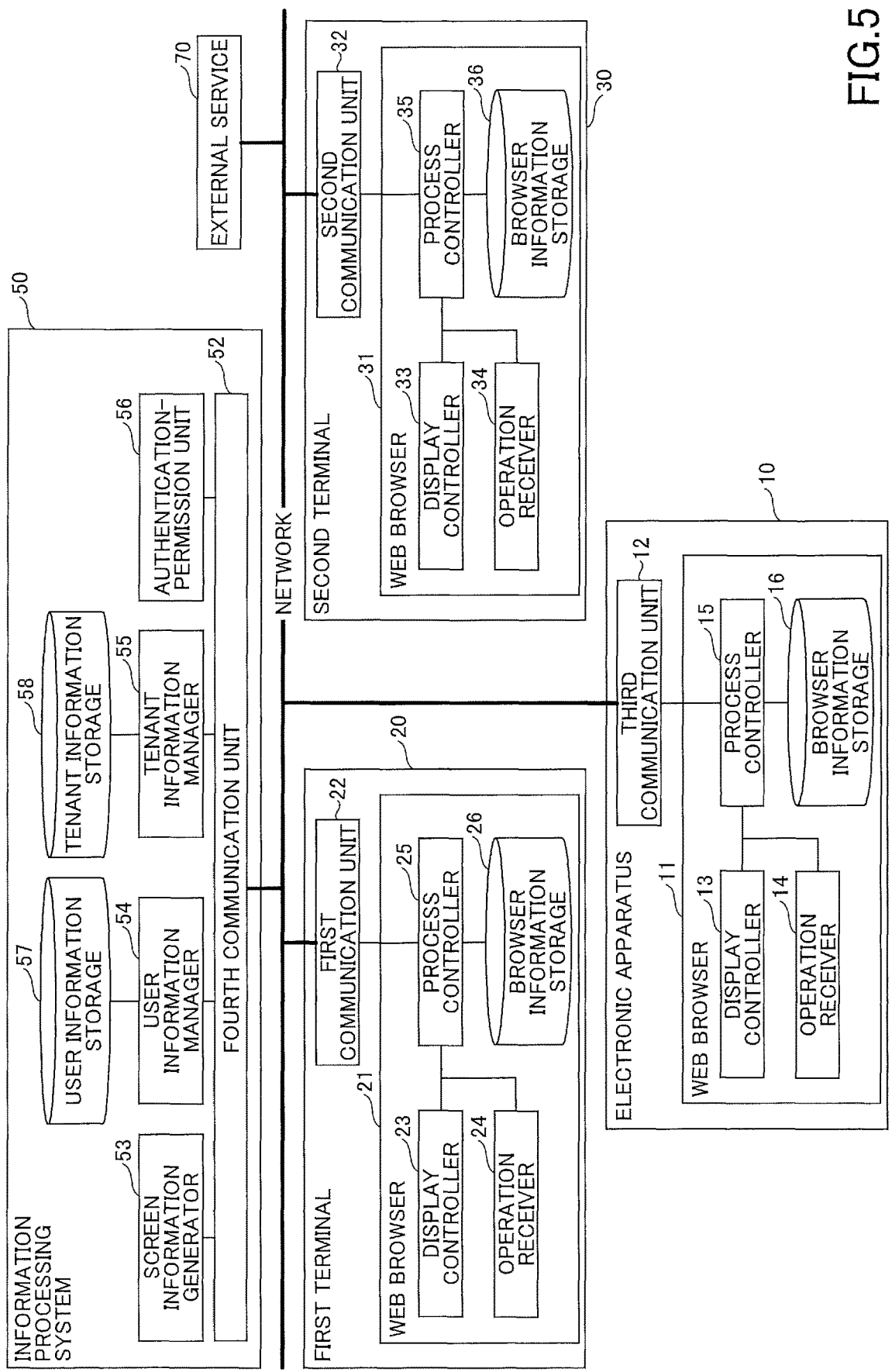
FIG. 5 is a block diagram illustrating an example of functional configurations of a first terminal, a second terminal, an electronic apparatus, and an information processing system.

The functions of apparatuses included in the information processing system 50 of the present embodiment are implemented by, for example, processing blocks illustrated in FIG. 5. FIG. 5 is a block diagram illustrating an example of functional configurations of the first terminal 20, the second terminal 30, the electronic apparatus 10, and the information processing system 50.

<<First Terminal>>

The first terminal 20 includes a first communication unit 22, a display controller 23, an operation receiver 24, and a process controller 25. The first terminal 20 implements functional blocks as illustrated in FIG. 5 by executing a program (e.g., a web browser 21).

The first communication unit 22 communicates with the information processing system 50 to send and receive various types of information that enable the first terminal 20 to display an appropriate login screen.

The display controller 23 analyzes screen information received from the information processing system 50 and displays, for example, a login screen on the display 506. The operation receiver 24 receives a user operation on the first terminal 20 (for example, an input of account information on the login screen).

The process controller 25 stores a login method used by the user and determines a login screen corresponding to a previously-used login method. The process controller 25 also controls subsequent processes depending on whether a login method is stored. The process controller 25 is implemented by executing JavaScript (registered trademark) included in screen information by an engine of the web browser 21.

The first terminal 20 includes a browser information storage 26 used by a program (for example, the web browser 21) to store information. The browser information storage 26 (an example of an information storage) is formed in, for example, the HD 504 and is a non-volatile memory that retains information even when the web browser 21 is terminated. A function called LocalStorage, which is implemented by HTML5, may be used as an internal storage area of the terminal that can be managed by the web browser 21.

In the present embodiment, one of login methods as listed in Table 1 is stored in the browser information storage 26. The browser information storage 26 may be provided outside of the first terminal 20 (for example, on a network or in a storage medium).

TABLE 1

| Stored login method (multiple methods may be stored) | Flag value |
|---|---|
| email address + password | email |
| tenant ID + user ID + password | userId |
| external service | external |
| all | all |

Table 1 indicates examples of login methods that can be stored in the browser information storage 26. The login methods (A) through (D) described above are indicated by flags. The process controller 25 can determine the stored login method by reading the flag.

For example, when the flag is "email", the first terminal 20 displays a login screen corresponding to the login method using an email address and a password. When the flag is "userId", the first terminal 20 displays a login screen corresponding to the login method using a tenant ID, a user ID, and a password. When the flag is "external", the first terminal 20 displays a login screen corresponding to the login method using an external service. When the flag is "all", the first terminal 20 displays a login screen corresponding to all login methods.

<<Second Terminal>>

The second terminal 30 includes a second communication unit 32, a display controller 33, an operation receiver 34, and a process controller 35. The second terminal 30 executes a program (e.g., a web browser 31) to implement functional blocks as illustrated in FIG. 5.

The second communication unit 32 communicates with the information processing system 50 to send and receive various types of information that enable the second terminal 30 to display an appropriate login screen.

The display controller 33 analyzes screen information received from the information processing system 50 and displays, for example, a login screen on the display 506. The operation receiver 24 receives an operation (for example, an input of account information on the login screen) of the administrator on the second terminal 30.

The process controller 35 stores a login method used by the administrator and determines a login screen corresponding to the previously-used login method. The process controller 35 also controls subsequent processes depending on whether a login method is stored. The process controller 35 is implemented by executing JavaScript (registered trademark) included in screen information by an engine of the web browser 31.

The browser information storage 36 is substantially the same as the browser information storage 26 of the first terminal 20, and therefore descriptions of the browser information storage 36 are omitted.

<<Electronic Apparatus>>

The electronic apparatus 10 includes a third communication unit 12, a display controller 13, an operation receiver 14, and a process controller 15. The electronic apparatus 10 implements functional blocks as illustrated in FIG. 5 by executing a program (for example, a web browser 11).

The third communication unit 12 communicates with the information processing system 50 to receive screen information used by the electronic apparatus 10 to display, for example, a standby screen, a launcher screen, a login screen, and an application screen. Also, the third communication unit 12 sends information input by the user on the standby screen, the launcher screen, the login screen, and the application screen to the information processing system 50.

The display controller 13 analyzes screen information received from the information processing system 50 and displays, for example, a standby screen, a launcher screen, a login screen, and an application screen on the operations panel 940. The operation receiver 14 receives user operations on the electronic apparatus 10 (for example, starting a launcher, inputting account information, selecting an application, and operating an application).

The process controller 15 and the browser information storage 16 are substantially the same as the process controller 25 and the browser information storage 26 of the first terminal 20. The electronic apparatus 10 is shared by multiple users. Therefore, the electronic apparatus 10 may be configured to send user information (manually-input user ID and password, or information obtained from an IC card or an authentication device), which is input to the electronic apparatus 10 at the time of device authentication when the user starts using the electronic apparatus 10, and a device authentication result to the information processing system 50 by using the web browser 11 or another application of the electronic apparatus 10 to identify a tenant corresponding to the user information, and display a login screen corresponding to a login method permitted by the tenant. Alternatively, when the web browser 11 or another application of the electronic apparatus 10 is used, the web browser 11 or another application of the electronic apparatus 10 may obtain device identification information (device number) or tenant identification information stored in the electronic apparatus 10 and send the device identification information or the tenant identification information to the information processing system 50 to identify a tenant corresponding to the electronic apparatus 10. In these cases, it is assumed that the tenant identification information, the device identification information, and the user information are stored in association with each other in the information processing system 50.

<<Information Processing System>>

The information processing system 50 includes a fourth communication unit 52, a screen information generator 53, a user information manager 54, a tenant information manager 55, and an authentication-permission unit 56. These functions of the information processing system 50 are implemented by executing a program loaded from the HD 504 into the RAM 503 by the CPU 501 of the computer 500 illustrated in FIG. 3.

The fourth communication unit 52 sends and receives various types of information to and from the first terminal 20, the second terminal 30, and the electronic apparatus 10. For example, the fourth communication unit 52 sends screen information of a login screen to the first terminal 20 or the second terminal 30, and receives account information from the first terminal 20 or the second terminal 30. Also, the fourth communication unit 52 sends screen information of a standby screen, a launcher screen, a login screen, and an application screen to the electronic apparatus 10, and receives information input on these screens.

The screen information generator 53 generates screen information of a login screen and a top screen (portal screen) and sends the screen information to the first terminal 20 or the second terminal 30 via the fourth communication unit 52.

The user information manager 54 manages the generation, updating, acquisition, and deletion of user information in the user information storage 57. The tenant information manager 55 similarly manages information on tenants to which users belong in the tenant information storage 58. Users and tenants are associated with each other by the user information and the tenant information.

The authentication-permission unit 56 authenticates the administrator and the users based on the account information and determines whether the authentication is successful or failed. Here, authentication indicates determining whether a user is a valid user. In the present embodiment, the authentication-permission unit 56 determines whether a user has a right to use the information processing system 50 and can also determine whether the user is a general user or an administrator. Also, permission indicates determining rights permitted to a user according to the user role (described later). For example, accessible resources and executable operations are determined.

When the authentication is successful, the information processing system 50 permits the user to log into the information processing system 50. Login is an authentication process performed to access system resources to use various services on a computer or the Internet by using pre-registered account information. Account information varies depending on the login methods (A) through (D) described above.

In the case of "(A) email address and password", account information includes an email address and a password. In the case of "(B) tenant ID, user ID and password", account information includes a tenant ID, a user ID, and a password. In the case of "(C) Using external service", there is no account information to be input by the user, but a user ID and a password for the external service 70 serve as account information. In the case of "(D) all", account information corresponding to each login method is used.

Further, account information may be biometric authentication information such as a fingerprint and a face. In this case, a login method corresponding to the biometric authentication information is provided.

The information processing system 50 also includes the user information storage 57 and the tenant information storage 58 that are implemented by, for example, the HD 504 or the RAM 503 illustrated in FIG. 3. The user information storage 57 and the tenant information storage 58 are described below using Tables 2, 3A, and 3B.

TABLE 2

| Parameter | Explanation | Example |
|---|---|---|
| Tenant ID | An ID identifying a tenant to which a user belongs | tenant1234 |
| User ID | An ID uniquely identifying a user in a tenant | user9876 |
| Password | A password | password |
| Password-set flag | A flag indicating whether a password has been set | True |
| Last name | The last name of a user | Patent |
| First name | The first name of a user | Taro |
| Email address | An email address of a user | taroh@example.com |
| Language | A language for displaying screens and email messages | Japanese |
| Country | A country to which a user belongs | Japan |
| State | A state of an account | Valid |
| Time zone | A time zone of a user | Asia/Tokyo |
| Role | A role indicating an administrator or a general user | Administrator |
| UUID | An ID uniquely identifying a user | aioij2389vjnwi |
| External service account information | Account information for an external service linked with a user | External service ID: user9999 |
| Available service list | A list of services that a user is permitted to use | service 1, service 2 |

Table 2 indicates an example of user information stored in the user information storage 57.

Tenant ID: identification information of a tenant to which a user belongs. ID is an abbreviation of Identification and indicates an identifier or identification information. An ID refers to a name, a code, a character string, a numerical value, or a combination of one or more of these items that is used to uniquely identify a specific object among multiple objects. The same applies to IDs other than the tenant ID.

User ID: identification information that uniquely identifies a user in a tenant. Because a user ID is unique in each tenant, the same user ID may indicate different users in different tenants.

Password: a password may be a part of account information.

Password-set flag: a flag that is set to True when a password is set, and is set to False when no password is set.

Last name: the last name (family name) of a user.

First name: the last name of a user.

Email address: an email address of a user. An email address is globally unique and is therefore also unique among different tenants. For this reason, an email address is often used as identification information for identifying a user.

Language: a language used by a terminal to display characters in various screens and email messages.

Country: a country or a region to which a user belongs.

State: a state of an account of a user. An account is a right of a user to log into the information processing system 50. The states of an account include at least "valid", "invalid", and "account locked". An account becomes invalid when user information is temporarily registered and becomes valid when user information is officially registered. Even after an account becomes valid, the administrator can set the account to invalid. An account is locked when a user enters incorrect passwords several times while the account is valid. The "account locked" differs from "invalid" in that the account returns to the valid state after a certain period of time and in that the user is still counted as a user belonging to a tenant. An account becomes "invalid" when, for example, the expiration date passes.

Time zone: the time zone (UTC: Coordinated Universal Time) of a country or a region where a user works.

Role: a role indicates a right of a user. In the present embodiment, roles include an administrator and a general user. In the present embodiment, both of a general user and an administrator are referred to as users when it is not necessary to distinguish them.

UUID (Universally Unique Identifier):

identification information that uniquely identifies a user and is used when the information processing system 50 identifies a user.

External service account information: information on an account in the external service 70 with which a user is linked and registered (identification information in the external service 70).

Available service list: a list of services that a user is permitted to use.

TABLE 3A

| Parameter | Explanation | Example |
| --- | --- | --- |
| Tenant ID | An ID uniquely identifying a tenant | tenant1234 |
| Tenant name | The name of a tenant | testtenant |
| Language | A language for displaying screens and email messages | Japanese |
| Country | A country to which a tenant belongs | Japan |
| State | A state of a tenant | Valid |
| Time zone | A time zone of a tenant | Asia/Tokyo |
| Login setting | A login method permitted by a tenant to log into a web application | Permit login with an email address and a password |

Table 3A indicates an example of tenant information stored in the tenant information storage 58.

Tenant ID: The same as "Tenant ID" in Table 2.

Tenant name: The name of a tenant (a name used by the user to call the tenant).

Language: a language for displaying characters in screens and email messages.

Country: a country or a region to which a tenant belongs.

State: states of a tenant include valid and invalid. Invalid indicates a state where the tenant cannot receive services due to, for example, the end of subscription.

Time zone: the time zone (UTC) of a country or a region where a tenant operates.

Login setting: a login method that a tenant permits the user to use to log into the information processing system 50 (see Table 3B).

TABLE 3B

| Tenant login setting (multiple items are selectable) | Flag value |
| --- | --- |
| Permit login with an email address and a password. | email |
| Permit login with a tenant ID, a user ID, and a password. | userId |
| Permit login with an external service. | external |
| Permit all login methods. | all |

Table 3B indicates examples of login settings. As indicated in Table 3B, each login setting is represented by a flag and indicates a login method(s) that a tenant permits users belonging to the tenant to use. Because the flag is sent from the information processing system 50 to the first terminal 20 or the second terminal 30, the first terminal 20 or the second terminal 30 can determine a login method permitted by the tenant (for the user).

As illustrated in FIG. 6, the administrator can set a login method in the tenant information storage 58 for each tenant. FIG. 6 is an example of a login method setting screen 400 displayed by the second terminal 30 being operated by the administrator. In the login method setting screen 400, check boxes 401 are associated with "all", "email address+password", "tenant ID+user ID+password", and "external service". The administrator can set a login method for each tenant that the administrator manages.

Process for Displaying Login Screen

Figure 7A:
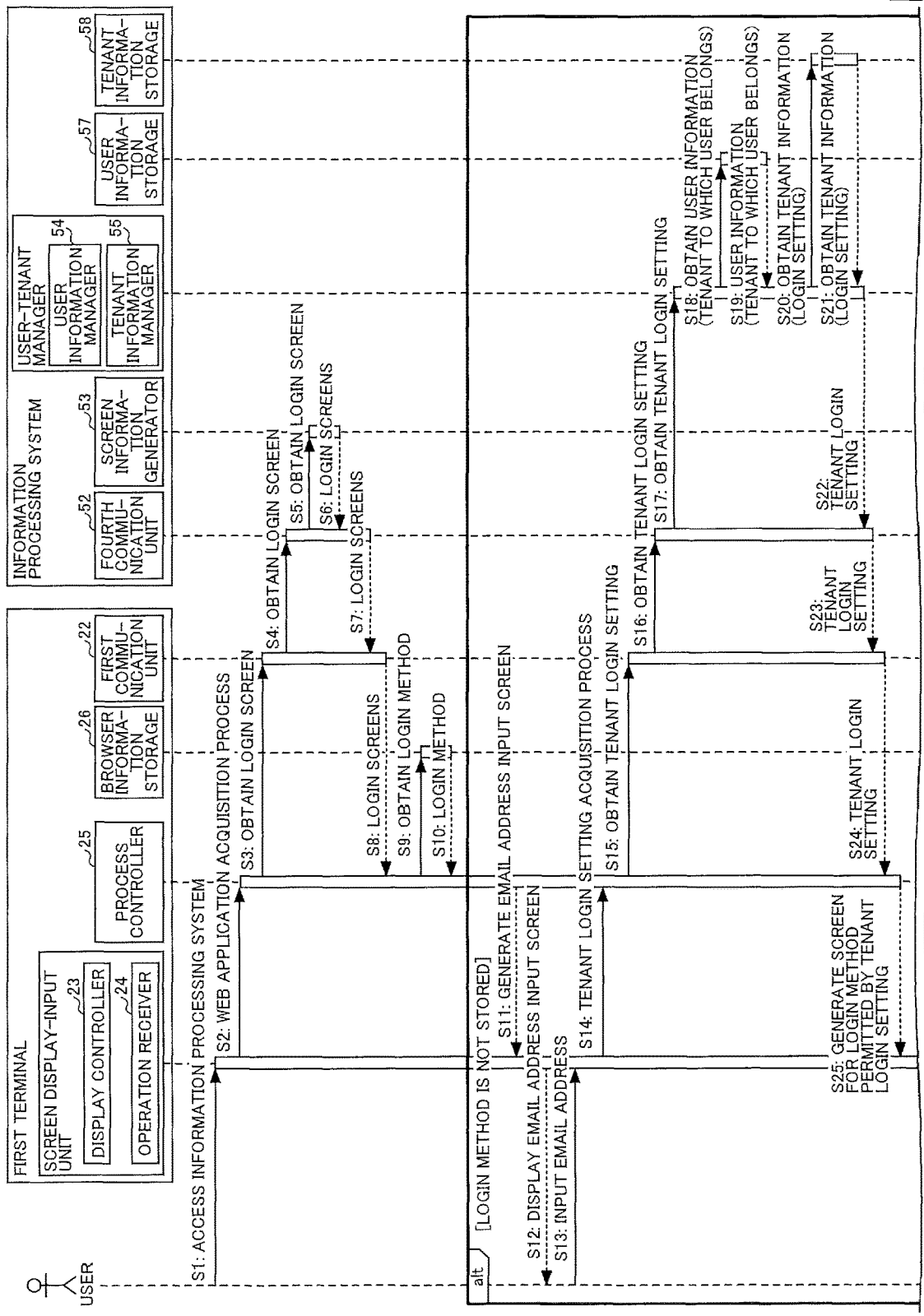
FIG. 7A is a sequence chart illustrating an example of a process for displaying a login screen.
Figure 7B:
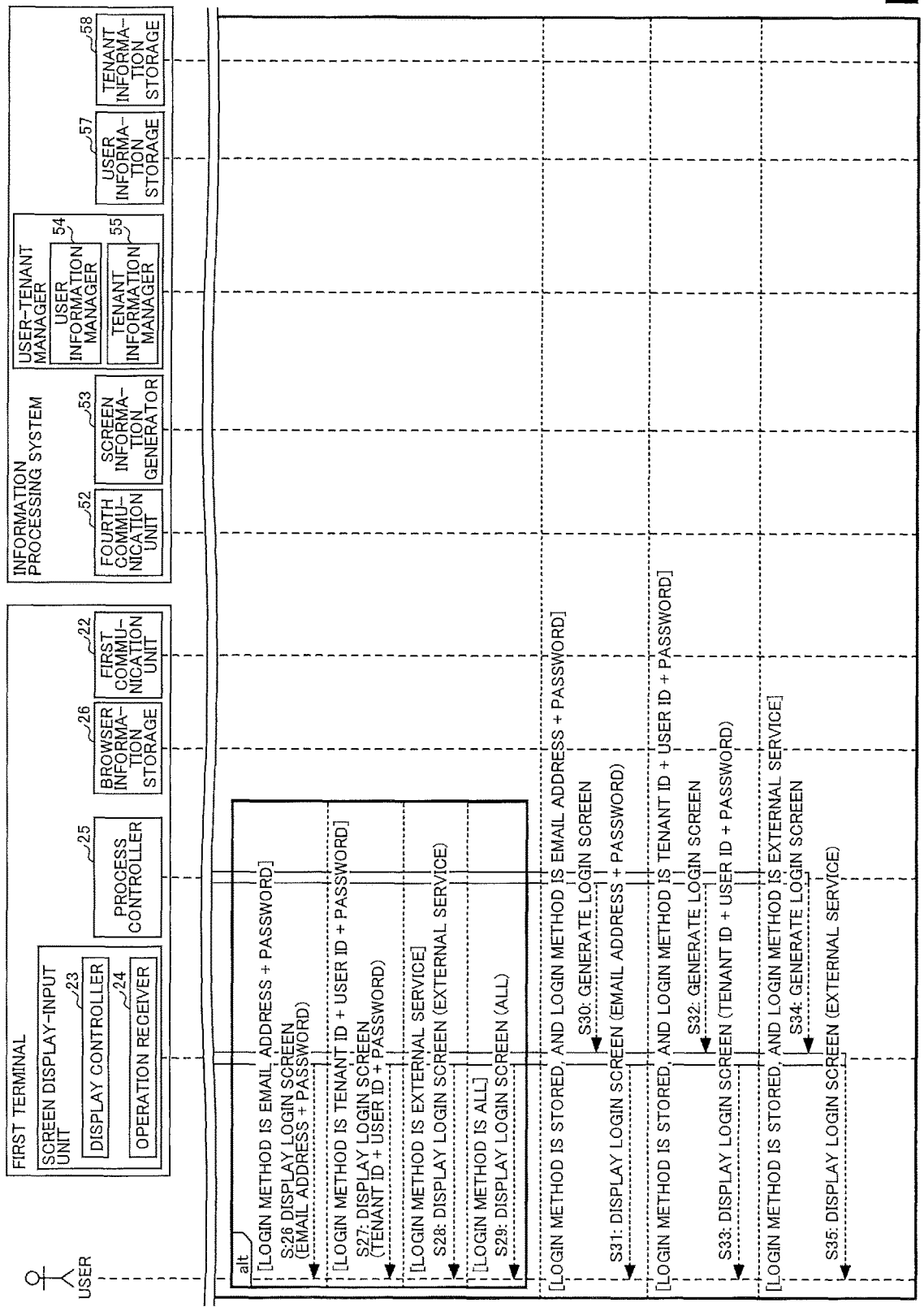
FIG. 7B is a sequence chart illustrating an example of a process for displaying a login screen.

A process where a user displays a login screen on the first terminal 20 or the second terminal 30 is described with reference to FIGS. 7A and 7B. The login process may be the same regardless of whether the user is a general user or an administrator. FIGS. 7A and 7B are sequence charts illustrating a process where the user operates the first terminal 20 to display a login screen.

S1: The user operates the first terminal 20 to communicate with the information processing system 50. For example, the user specifies, or selects from Favorites, a URL of the information processing system 50.

S2: The operation receiver 24 of the first terminal 20 receives the operation and reports a web application acquisition process to the process controller 25. For example, a process for making an HTTP request and the URL of the information processing system 50 are reported.

S3: The process controller 25 requests the first communication unit 22 to obtain a login screen by specifying the URL described above.

S4: The first communication unit 22 sends a login screen acquisition request to the information processing system 50.

S5: The fourth communication unit 52 of the information processing system 50 receives the login screen acquisition request and requests the screen information generator 53 to send a login screen.

S6: The screen information generator 53 generates screen information of a login screen that can be displayed by the first terminal 20 and sends the screen information to the fourth communication unit 52. The login screen that can be displayed by the first terminal 20 is a login screen corresponding to a login setting being managed in the tenant information storage 58. At this stage, the login screen to be used by the user is unknown. Therefore, the screen information generator 53 generates screen information for all login screens that can be set by the administrator in the information processing system 50. Each login screen is associated with identification information (for example, a flag) of the corresponding login setting.

S7: The fourth communication unit 52 sends the screen information of the login screens to the first terminal 20.

S8: The first communication unit 22 of the first terminal 20 receives the screen information of the login screens and sends the screen information to the process controller 25.

S9, S10: The process controller 25 obtains a login method from the browser information storage 26. That is, because the flag is set to "email", "userId", "external", or "all", the process controller 25 searches the browser information storage 26 to find a flag, and obtains the found flag. Because a flag corresponding to a login method used last time (or previously) by the user is stored, the number of stored flags is one. The process controller 25 determines the previously-stored login method as the login method to be used by the user.

If the user has never logged in or if the browser information storage 26 of the web browser 21 has been deleted, no login method is stored in the browser information storage 26. A process performed in this case is described using steps S11 through S29.

S11: When no login method is stored in the browser information storage 26, to identify a tenant to which the user belongs, the process controller 25 selects an email address input screen from the login screens obtained from the information processing system 50 and requests the display controller 23 to display the email address input screen. The email address input screen is one of the login screens for entering an email address. FIG. 8 illustrates an example of the email address input screen.

S12: The display controller 23 generates and displays the requested email address input screen on the display 506.

S13: When the user inputs an email address on the email address input screen, the operation receiver 24 receives the email address.

S14: The operation receiver 24 sends the email address to the process controller 25.

S15: The process controller 25 sends, to the first communication unit 22, the email address and a request to obtain a login setting of a tenant to which the user belongs. The process controller 25 temporarily retains the email address so that the user does not have to enter the email address in a login screen A1 or B1 described later. For example, this is achieved using a mechanism called sessionStorage.

S16: The first communication unit 22 sends the email address and a request for a login setting to the information processing system 50.

S17: The fourth communication unit 52 of the information processing system 50 receives the email address and the request for a login setting and requests the user information manager 54 to obtain user information based on the email address.

S18, S19: The user information manager 54 searches the user information storage 57 based on the email address, and obtains user information including the email address.

S20, S21: The user information manager 54 sends the user information to the tenant information manager 55, and the tenant information manager 55 searches the tenant information storage 58 with a tenant ID included in the user information. Thus, the tenant information manager 55 obtains tenant information of a tenant to which the user belongs.

S22-S24: The information processing system 50 sends a login setting included in the tenant information to the first terminal 20.

S25: The process controller 25 of the first terminal 20 determines a login screen corresponding to a login method permitted by the login setting obtained at step S24 among the login screens obtained at step S8. Then, the process controller 25 requests the display controller 23 to display the login screen. When requesting to display the login screen A1 or B1, the process controller 25 also sends the retained email address to the display controller 23. When multiple login methods are permitted, the displayed login screen corresponds to the multiple login methods.

Figure 9:
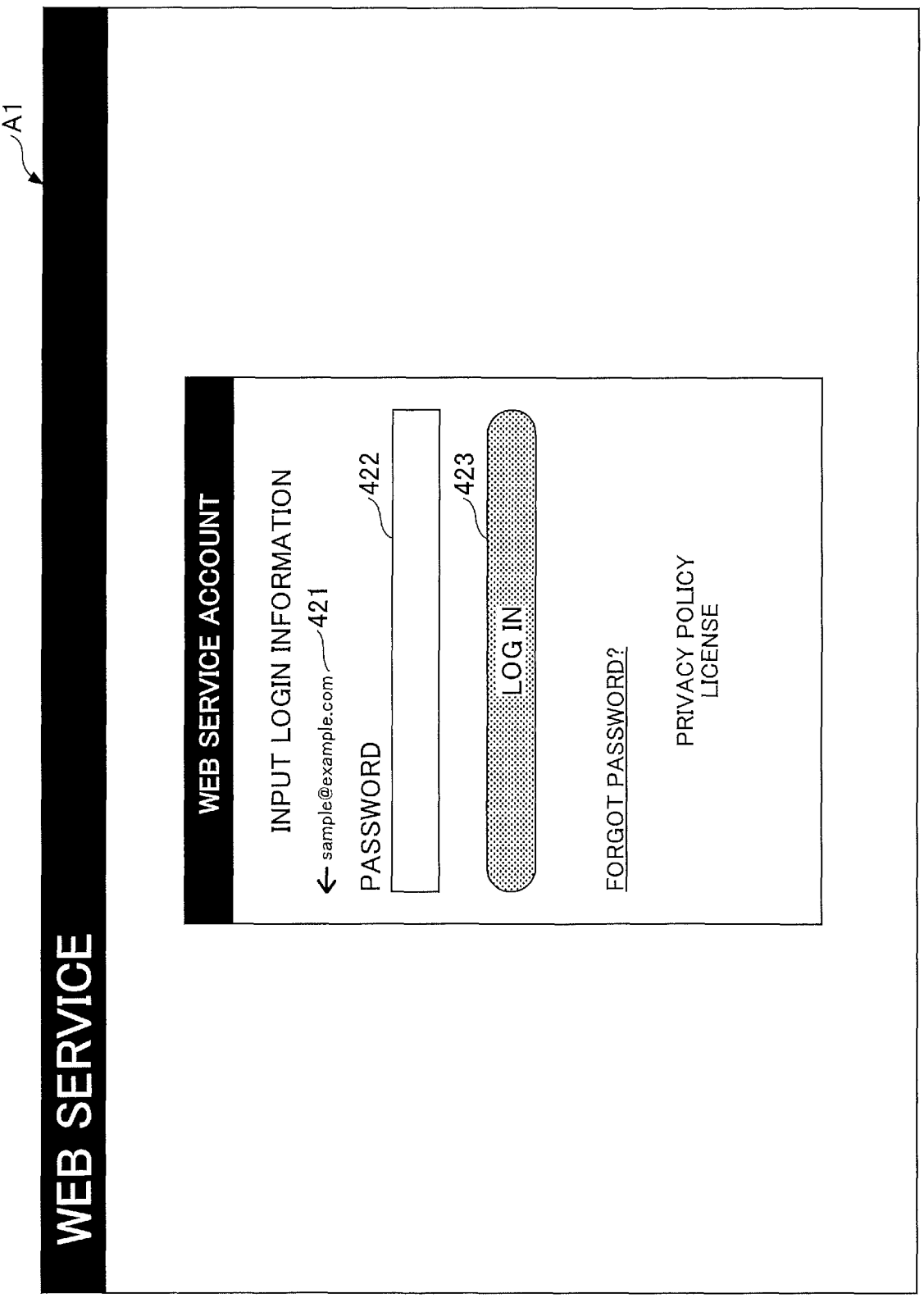
FIG. 9 is a drawing illustrating an example of a login screen A1.

S26: When the login method is "(A) Email address and password", the display controller 23 displays a login screen A1. FIG. 9 illustrates an example of the login screen A1.

Figure 10:
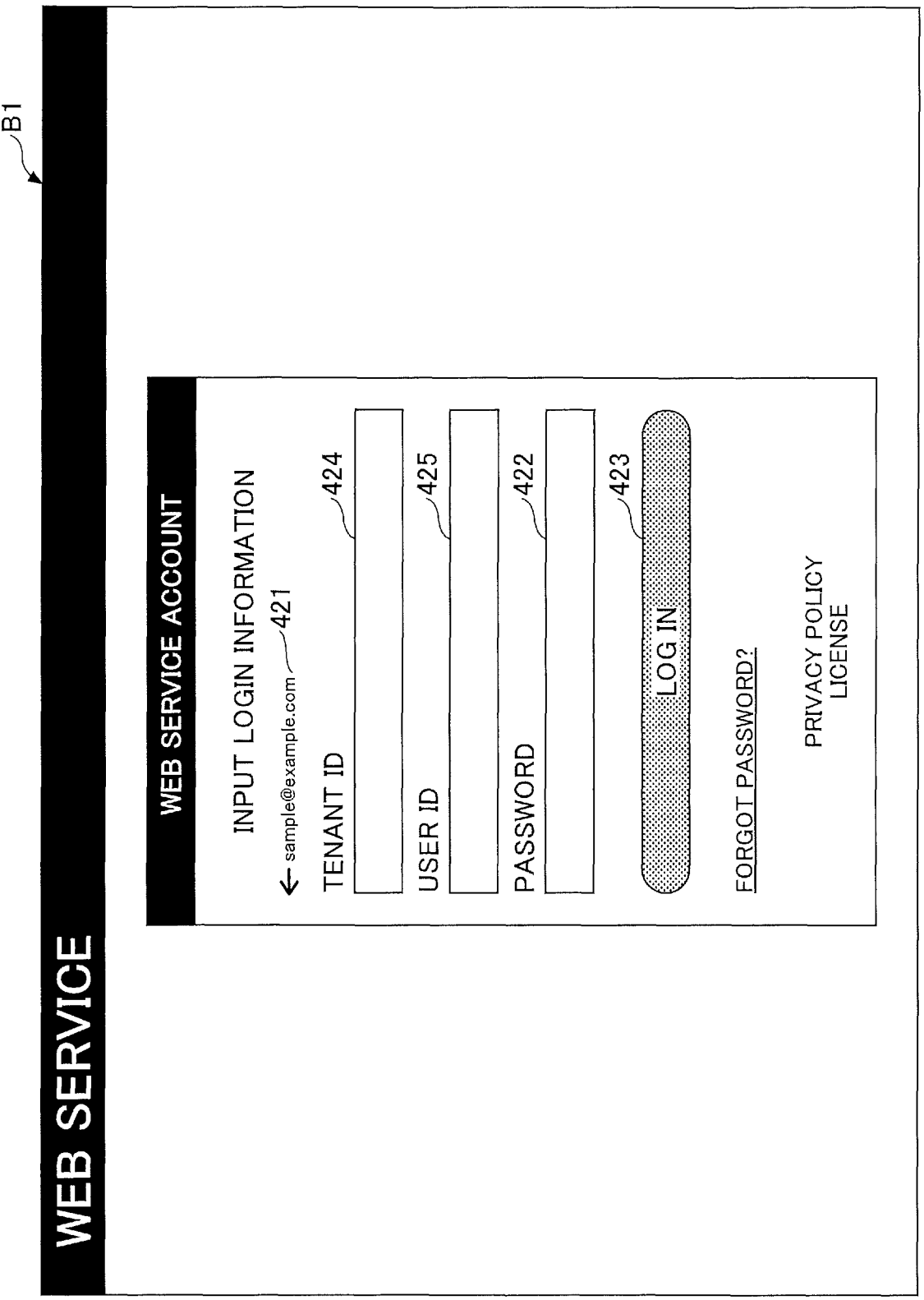
FIG. 10 is a drawing illustrating an example of a login screen B1.

S27: When the login method is "(B) Tenant ID, user ID, and password", the display controller 23 displays a login screen B1. FIG. 10 illustrates an example of the login screen B1.

Figure 11:
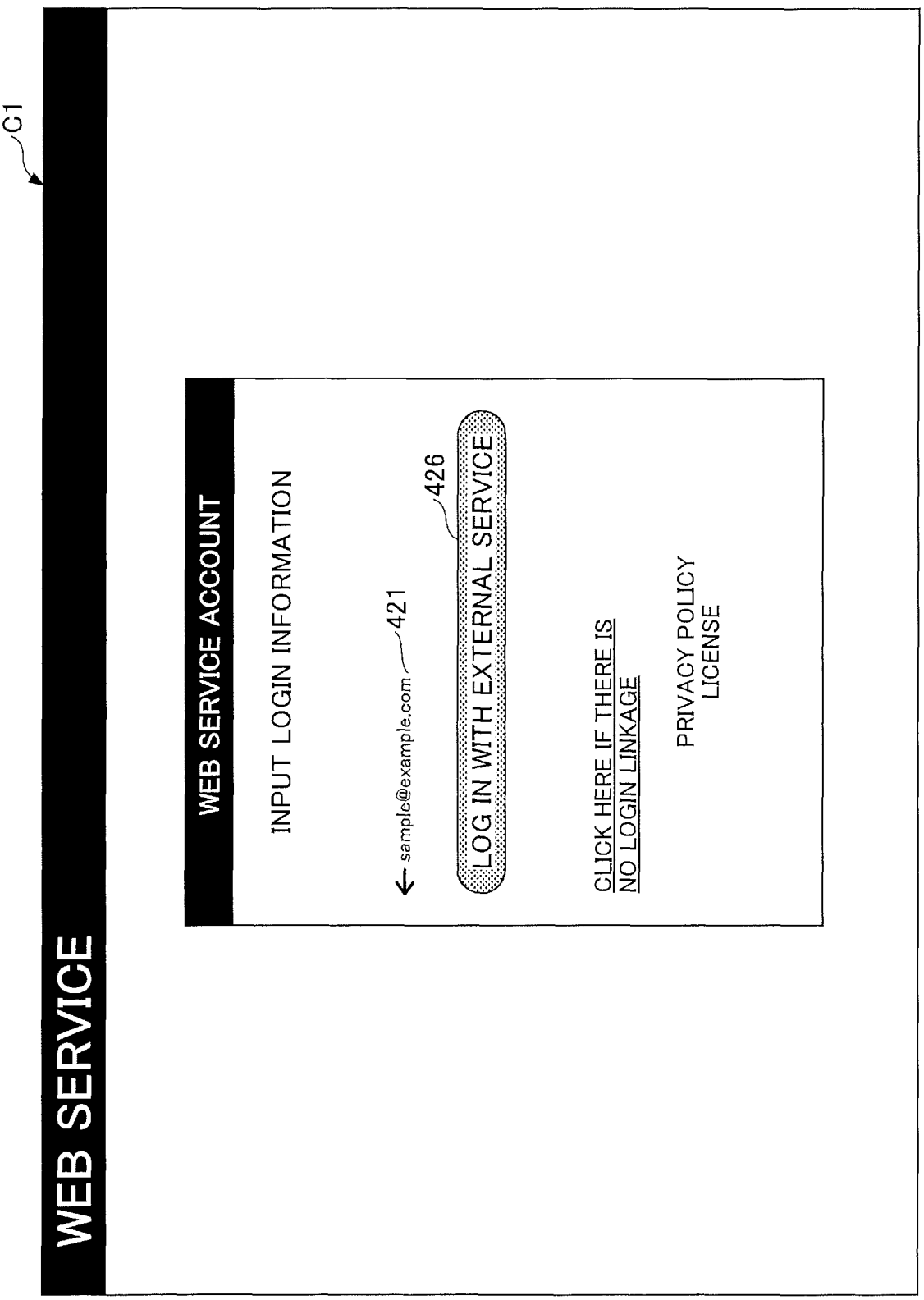
FIG. 11 is a drawing illustrating an example of a login screen C1.

S28: When the login method is "(C) Using external service", the display controller 23 displays a login screen C1. FIG. 11 illustrates an example of the login screen C1.

Figure 12:
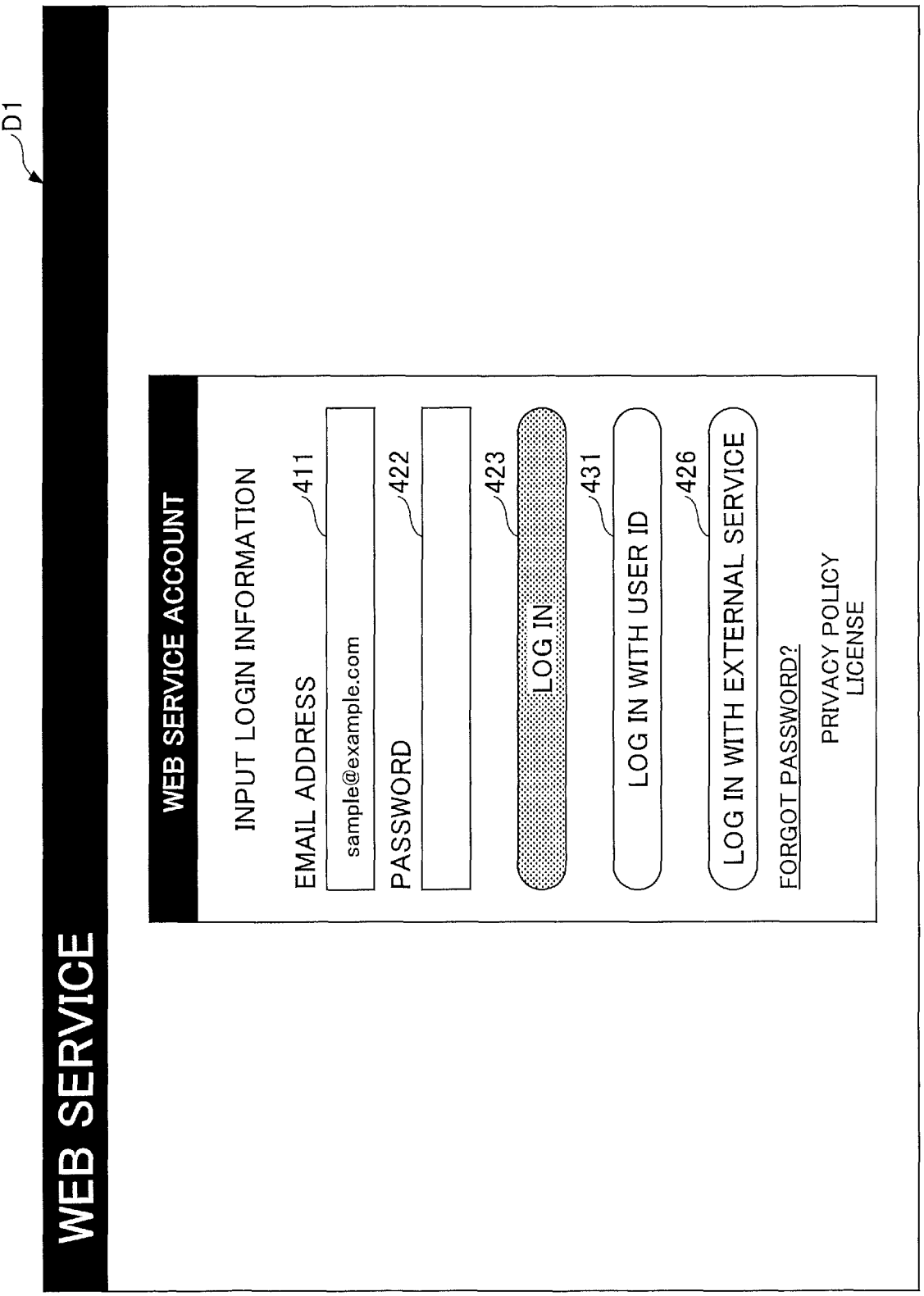
FIG. 12 is a drawing illustrating an example of a login screen D1.

S29: When login method is "(D) All", the display controller 23 displays a login screen D1. FIG. 12 illustrates an example of the login screen D1.

Next, a case where a login method is stored in the browser information storage 26 is described. When a login method is stored, at step S10, the process controller 25 determines a login screen corresponding to the stored login method among the login screens obtained at step S8. At step S30, S32, or S34, the process controller 25 requests the display controller 23 to display the determined login screen.

Figure 13:
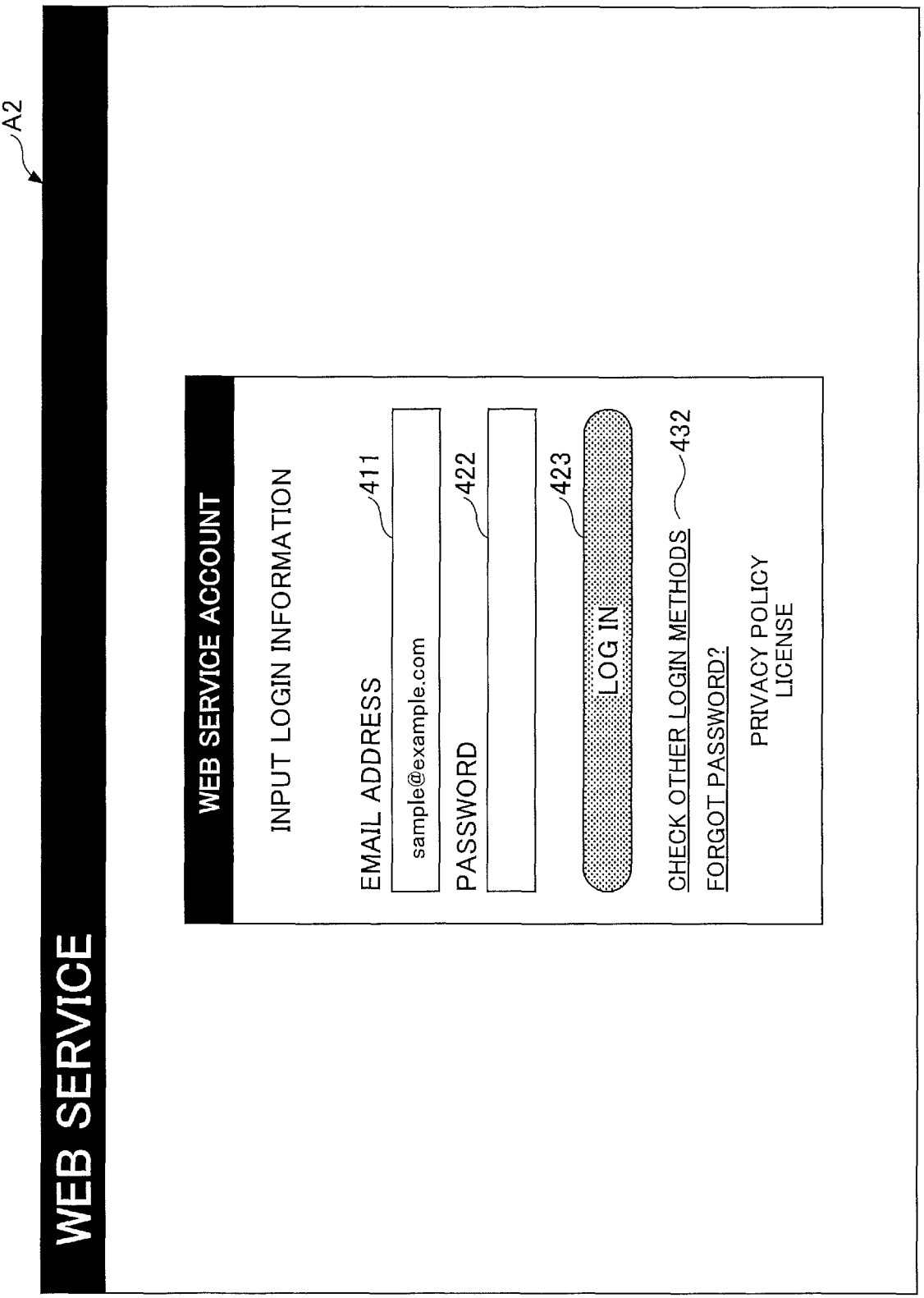
FIG. 13 is a drawing illustrating an example of a login screen A2.

S31: When the login method stored in the browser information storage 26 is "(A) Email address and password", the display controller 23 displays a login screen A2. FIG. 13 illustrates an example of the login screen A2.

Figure 14:
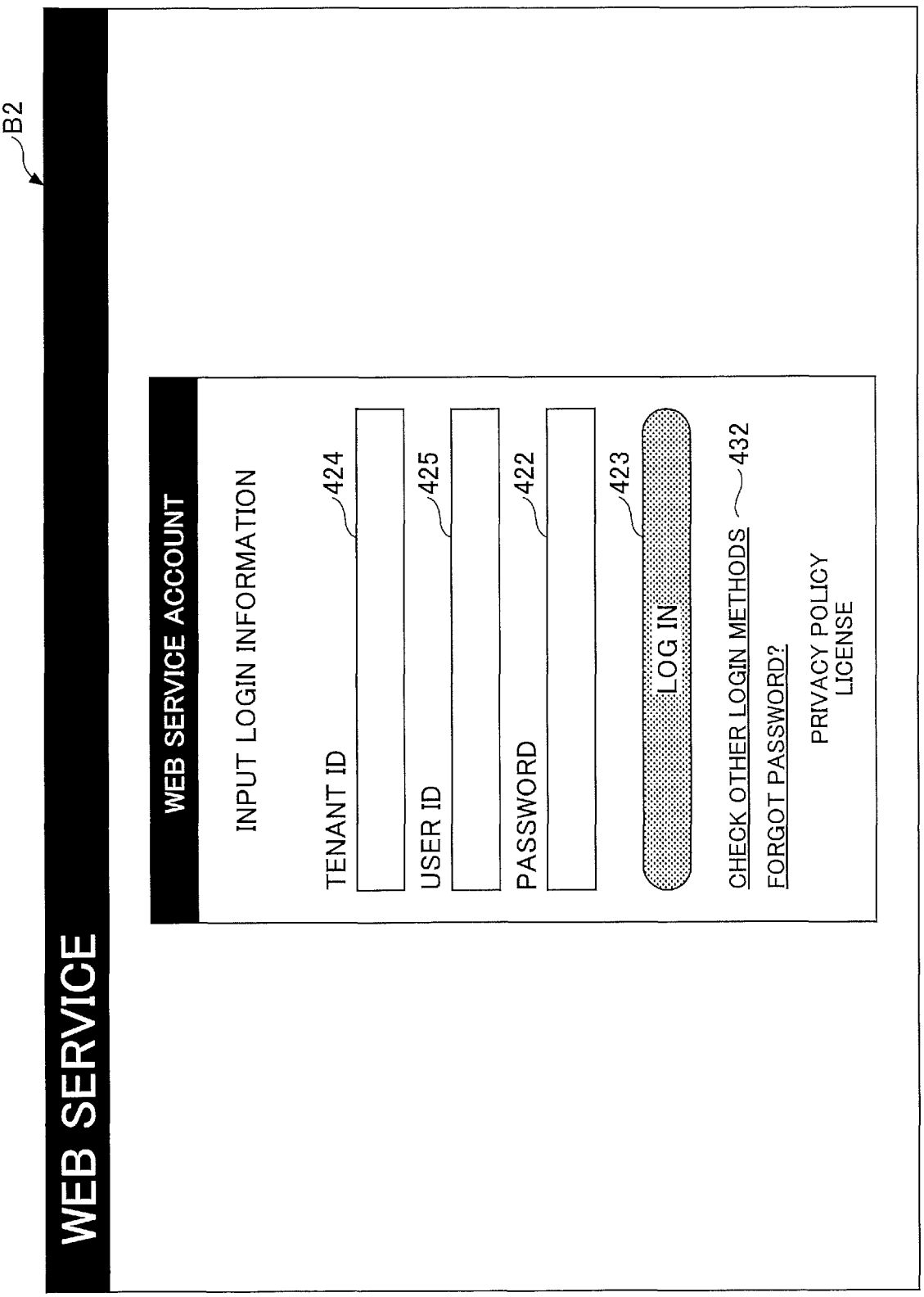
FIG. 14 is a drawing illustrating an example of a login screen B2.

S33: When the login method stored in the browser information storage 26 is "(B) Tenant ID, user ID, and password", the display controller 33 displays a login screen B2. FIG. 14 illustrates an example of the login screen B2.

Figure 15:
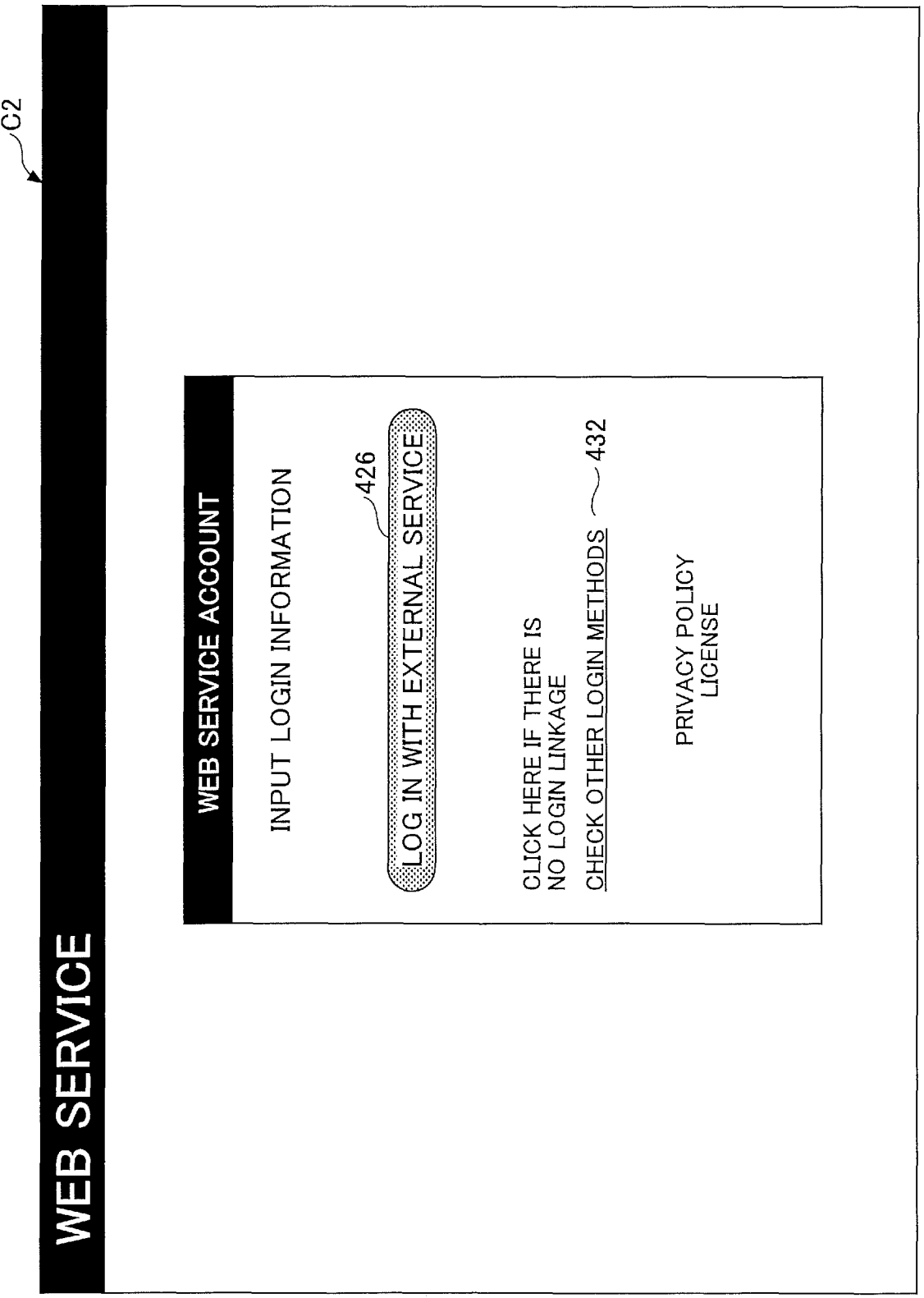
FIG. 15 is a drawing illustrating an example of a login screen C2.

S35: When the login method stored in the browser information storage 26 is "(C) Using external service", the display controller 23 displays a login screen C2. FIG. 15 illustrates an example of the login screen C2.

Thus, the first terminal 20 can display a login screen corresponding to a stored login method.

Examples of Login Screens

Examples of login screens are described with reference to FIGS. 8 through 16. FIG. 8 is an example of an email address input screen 410 that is a part of a login screen. The email address input screen 410 includes an email address input field 411 and a next button 412. The email address input field 411 is a field in which the user inputs an email address of the user. The next button 412 causes the first terminal 20 to send the input email address to the information processing system 50.

FIG. 9 illustrates an example of the login screen A1. The login screen A1 includes an email address display field 421, a password input field 422, and a login button 423. The email address display field 421 displays the email address entered by the user on the email address input screen 410. This eliminates the need to enter the same email address multiple times. The user can also return to the email address input screen 410. The password input field 422 is a field in which the user inputs a password of the user. The login button 423 causes the first terminal 20 to send the email address and the password to the information processing system 50 to make a login request.

FIG. 10 illustrates an example of the login screen B1. The login screen B1 includes an email address display field 421, a tenant ID input field 424, a user ID input field 425, a password input field 422, and a login button 423. The email address display field 421 displays the email address entered by the user on the email address input screen. This eliminates the need to enter the same email address multiple times (the email address is not necessarily sent to the information processing system 50). The user can also return to the email address input screen 410. The tenant ID input field 424 is a field in which the user inputs a tenant ID of a tenant to which the user belongs. The user ID input field 425 is a field in which the user inputs a user ID used in the tenant to which the user belongs. The password input field 422 is a field in which the user inputs a password of the user. The login button 423 causes the first terminal 20 to send the tenant ID, the user ID, and the password to the information processing system 50 to make a login request.

FIG. 11 illustrates an example of the login screen C1. The login screen C1 includes an email address display field 421 and an external service login button 426. The email address display field 421 displays the email address entered by the user on the email address input screen 410. This eliminates the need to enter the same email address multiple times (the email address is not necessarily sent to the information processing system 50). The external service login button 426 causes the first terminal 20 to send a request for login using the external service 70 to the information processing system 50. After sending the request, the first terminal 20 is redirected to the external service 70.

FIG. 12 illustrates an example of the login screen D1. The login screen D1 includes an email address input field 411, a password input field 422, a login button 423, a user ID login button 431, and an external service login button 426. In the email address input field 411, the email address entered by the user on the email address input screen 410 is displayed. This eliminates the need to enter the same email address multiple times. The password input field 422 is a field in which the user inputs a password of the user. The login button 423 causes the first terminal 20 to send the email address and the password to the information processing system 50 to make a login request.

The user ID login button 431 is for displaying the login screen B1 of FIG. 10. The external service login button 426 causes the first terminal 20 to send a request for login using the external service 70 to the information processing system 50. Thus, when the login method is "all", the user can change the login screens.

FIG. 13 illustrates an example of the login screen A2. The login screen A2 includes an email address input field 411, a password input field 422, a login button 423, and a "check other login method" button 432. The email address input field 411 is a field in which the user inputs an email address of the user. When a login method is stored in the browser information storage 26, the user has not entered an email address. Accordingly, no email address is displayed in the email address input field 411. However, because the web browser has a function to retain an email address previously entered by the user, and the email address may be displayed using the function of the web browser. The password input field 422 and the login button 423 are the same as those in the login screen A1. The "check other login method" button 432 allows the user to check a login method(s) (a login method permitted by the tenant) that is different from the login method stored in the browser information storage 26.

FIG. 14 illustrates an example of the login screen B2. The login screen B2 includes a tenant ID input field 424, a user ID input field 425, a password input field 422, a login button 423, and a "check other login method" button 432. These items are the same as those in the login screen B1. The "check other login method" button 432 is the same as that in the login screen A2.

FIG. 15 illustrates an example of the login screen C2. The login screen C2 includes an external service login button 426 and a "check other login method" button 432. The external service login button 426 is the same as that in the login screen C1. The "check other login method" button 432 is the same as that in the login screen A2.

FIG. 16 is an example of a login screen F that is displayed when multiple login methods are permitted. The login screen F corresponds to a case where the login methods "(A) Email address and password" and "(C) Using external service" are permitted. Accordingly, the login screen F includes an email address input field 411, a password input field 422, and an external service login button 426. Thus, when multiple login methods are permitted, the first terminal 20 can display login screens corresponding to the multiple login methods, and the user can select a preferred login method.

Login Process

Figure 17A:
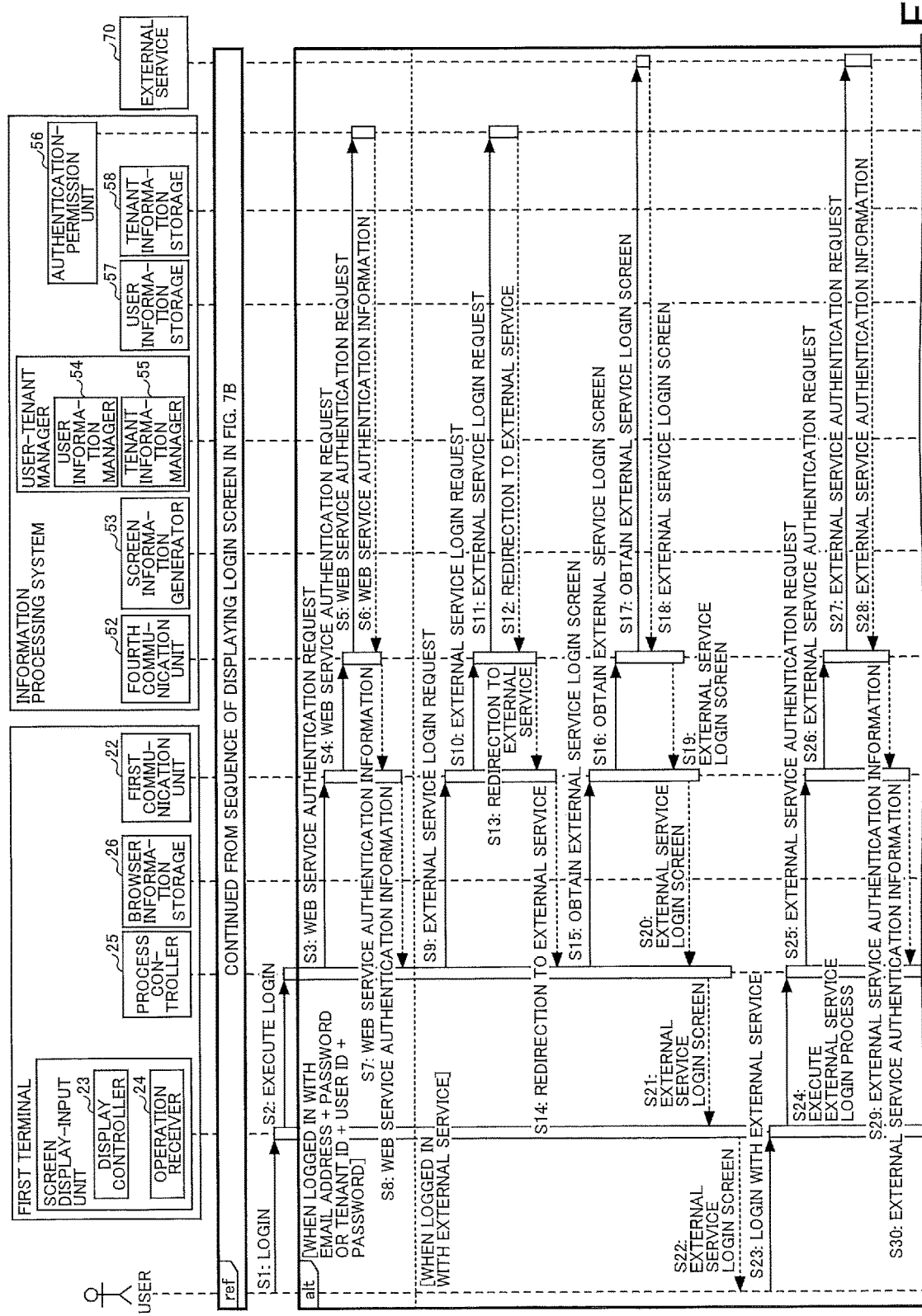
FIG. 17A is a sequence chart illustrating login processes corresponding to login methods.
Figure 17B:
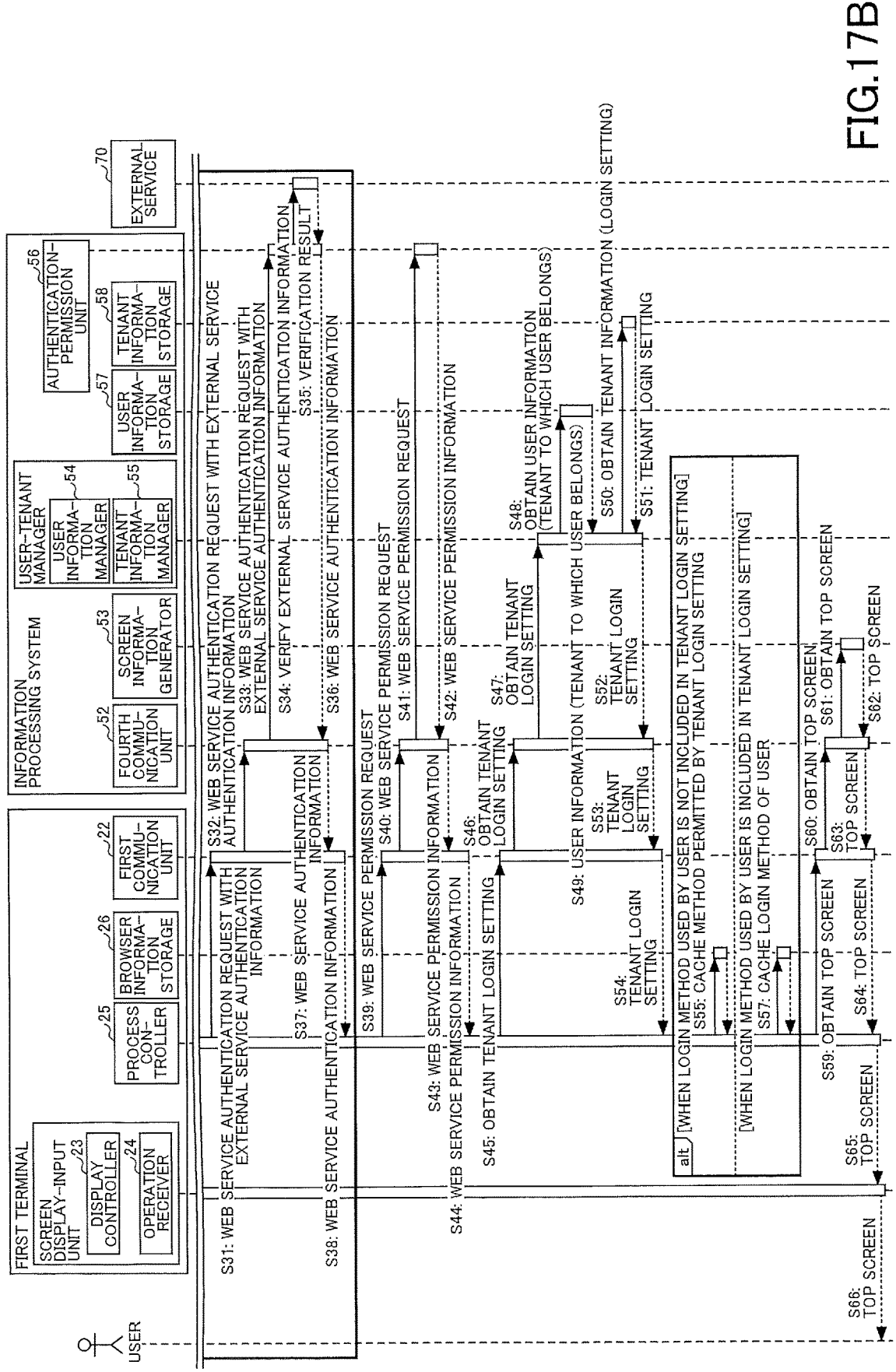
FIG. 17B is a sequence chart illustrating login processes corresponding to login methods.

Next, a process where the user logs in with each login method and stores the login method in the browser information storage 26 after the process of the sequence chart of FIG. 7B is described with reference to FIGS. 17A and 17B. FIGS. 17A and 17B are sequence charts illustrating login processes corresponding to the respective login methods. The processes of FIGS. 17A and 17B are performed after the process of FIG. 7.

S1, S2: The user inputs a password on the login screen A1, inputs a tenant ID, a user ID, and a password on the login screen B1, inputs an email address and a password on the login screen A2, or inputs a tenant ID, a user ID, and a password on the login screen B2. The operation receiver 24 receives these inputs as account information. The operation receiver 24 of the first terminal 20 sends the account information to the process controller 25 and requests a login process.

Steps S3 through S8 are performed when the login method is "(A) Email address and password" or "(B) Tenant ID, user ID, and password".

S3-S5: The process controller 25 sends an authentication request together with the account information to the information processing system 50. The account information and the authentication request are transmitted to the authentication-permission unit 56 via the first communication unit 22 and the fourth communication unit 52. The authentication-permission unit 56 determines that the authentication has succeeded if the account information is stored in the user information storage 57, and determines that the authentication has failed if the account information is not stored in the user information storage 57.

At step S3, the process controller 25 temporarily stores the login method used by the user. As will be explained at step S55, this is to determine whether the login setting stored in the browser information storage 26 is included in the tenant login setting. The login method used by the user may be determined based on the login screen used by the user or based on the account information to be transmitted. Alternatively, the login method may be stored at step S8.

S6-S8: When the authentication has succeeded, the authentication-permission unit 56 sends information indicating that the authentication has succeeded to the first terminal 20. In FIG. 17, authentication information is used to indicate that the authentication has succeeded.

Steps S9 through S38 are performed when the login method is "(C) Using external service". Similarly, at step S9, the process controller 25 temporarily stores the login method used by the user. Alternatively, the login method may be stored at step S38.

S9, S10: The user presses the external service login button 426 on the login screen C1 or C2. The operation receiver 24 receives the pressing operation. A request for login with the external service 70 is sent to the authentication-permission unit 56 via the first communication unit 22 and the fourth communication unit 52.

S11-S14: Upon receiving information indicating that the external service login button 426 has been pressed, the authentication-permission unit 56 sends a redirection request for redirection to the external service 70 to the first terminal 20 together with the known URL of the external service 70. The URL of the external service 70 and the redirection request to the external service 70 are sent to the process controller 25 via the first communication unit 22 and the fourth communication unit 52. Common tickets for identifying users are stored in advance in each of the information processing system 50 and the external service 70.

S15-S20: The process controller 25 is redirected to the external service 70 based on the URL of the external service 70. That is, the process controller 25 is redirected to the external service 70 and obtains screen information of a login screen of the external service 70. The login screen of the external service 70 varies depending on the type of the external service 70.

S21, S22: The process controller 25 sends the screen information of the login screen of the external service 70 to the display controller 23, and the display controller 23 displays the login screen of the external service 70.

S23: The user performs a login operation on the login screen of the external service 70. The operation receiver 24 receives the login operation. In general, in a site such as the external service 70 that requires login, account information is stored using a technology such as a cookie or LocalStorage, and the user does not need to enter account information on the login screen of the external service 70. Therefore, when the user uses the external service 70, the user only needs to press the external service login button 426.

S24-S27: The operation receiver 24 sends pre-stored account information and an authentication request to the external service 70 via the process controller 25, the first communication unit 22 and the fourth communication unit 52. The external service 70 authenticates the user and when the authentication is successful, obtains a ticket associated with the user. The ticket is the proof of the identity of the user. An authentication linkage service such as OAUTH is known as a mechanism for such external authentication, and it is assumed that OAUTH can be used in the present embodiment.

S28-S30: The external service 70 sends the ticket to the first terminal 20. In FIG. 17, the ticket is represented by authentication information.

S31-S33: The process controller 25 requests the authentication-permission unit 56 to perform authentication using the ticket (authentication information) received from the external service 70. The authentication request is sent to the authentication-permission unit 56 via the first communication unit 22 and the fourth communication unit 52.

S34: The authentication-permission unit 56 requests the external service 70 to verify the authentication information (to confirm that the authentication information has been issued by the external service 70). When the authentication information is successfully verified by the external service 70, the login to the information processing system 50 is permitted. Also, the user is identified by the ticket.

S35-S38: the authentication-permission unit 56 sends authentication information indicating whether authentication has succeeded to the first terminal 20. The authentication information is transmitted to the process controller 25 via the first communication unit 22 and the fourth communication unit 52.

S39-S41: When the authentication has succeeded, the process controller 25 sends a permission request to the information processing system 50. Here, permission indicates a range of resources that a user can access (i.e., rights of the user). The process controller 25 sends a permission request to the information processing system 50 together with the authentication information. The permission request is sent to the authentication-permission unit 56 via the first communication unit 22 and the fourth communication unit 52.

S42-S44: For a user using the login method (A) or (B), the authentication-permission unit 56 sends a role of user information and an available service right information list to the first terminal 20 as a range of resources that can be accessed by a user identified by an email address or a user ID and a tenant ID. For a user using the login method (C), the authentication-permission unit 56 identifies the user based on the ticket, issues a token (identification information for identifying the user), and sends similar information to the first terminal 20. Hereafter, the role of user information and the available service right information list are referred to as "permission information".

S45-S47: Upon receiving the permission information, the process controller 25 sends, to the information processing system 50, user identification information (an email address, a user ID and a tenant ID, or a token) and a request for a login setting of a tenant to which the user belongs. The permission information is sent to report information that the user can access. The login setting request is sent to the information processing system 50 via the first communication unit 22 and the fourth communication unit 52.

S48, S49: The user information manager 54 obtains user information from the user information storage 57 of the user identified based on the user identification information.

S50, S51: The user information manager 54 sends the user information to the tenant information manager 55, and the tenant information manager 55 searches the tenant information storage 58 with a tenant ID included in the user information. Thus, the tenant information manager 55 obtains tenant information of a tenant to which the user belongs.

S52-S54: The information processing system 50 sends a login setting included in the tenant information to the first terminal 20.

The process controller 25 determines whether the login setting used by the user is permitted by the login setting of the tenant. This is because the process controller 25 preferably changes the login method of the user when the login setting of the tenant is changed. The process controller 25 may determine whether the login setting used by the user is included in the login setting of the tenant. A case where the login setting used by the user is not included in the login setting of the tenant occurs when a login method stored in the browser information storage 26 is used. Accordingly, this is the same as determining whether a login method stored in the browser information storage 26 is included in the login setting of the tenant.

S55: When the login setting used by the user is not permitted by the login setting of the tenant, the process controller 25 stores the login setting of the tenant in the browser information storage 26. When there are multiple tenant login settings, all of the login settings may be stored.

S57: When the login setting used by the user is permitted by the login setting of the tenant, the process controller 25 stores the login method temporarily stored at step S3, S8, S9, or S38 in the browser information storage 26.

Figure 18B:
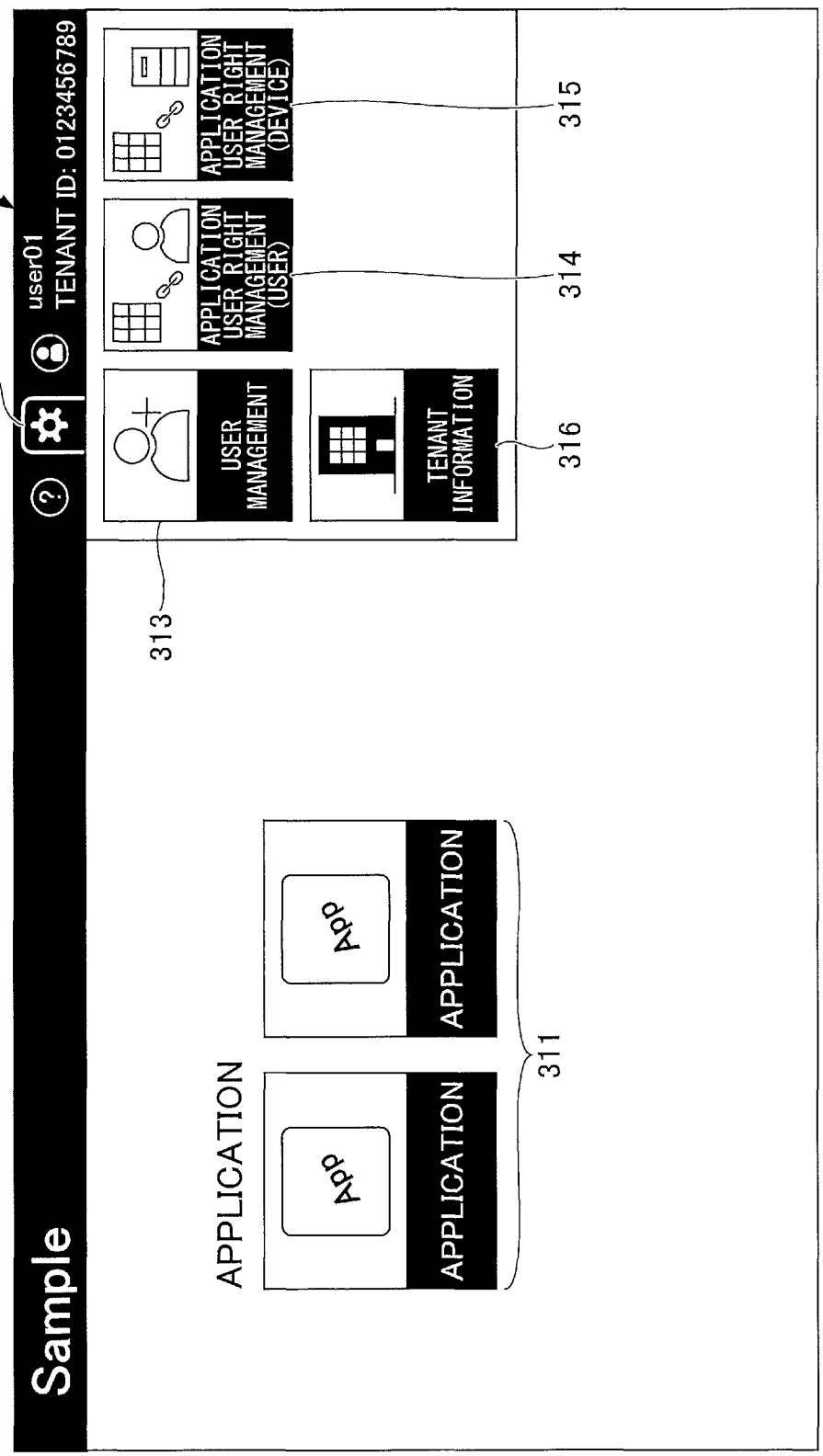
FIG. 18B is a drawing illustrating an example of a top screen.

S59-S66: Next, the process controller 25 sends a request for a top screen (portal screen) to the information processing system 50. The screen information generator 53 of the information processing system 50 refers to the user information storage 57, generates screen information including icons for executing services permitted for the user identified based on the user identification information, and sends the screen information to the first terminal 20. Thus, a portal screen corresponding to the logged-in user can be displayed. FIGS. 18A and 18B illustrate examples of top screens.

Examples of Top Screens

FIG. 18A is an example of a top screen 460 displayed by the first terminal 20, and FIG. 18B is an example of a top screen 310 displayed by the second terminal 30. When the authentication has succeeded as explained with reference to FIGS. 17A and 17B, the first terminal 20 displays the top screen 460. The top screen 460 displays a list 311 of applications corresponding to services permitted by the "available service right information list" in the user information.

The top screen 310 for the administrator has a similar configuration but additionally includes a setting button 312. When the administrator presses the setting button 312, buttons for user management 313, application use right management (user) 314, application use right management (device) 315, and tenant information 316 are displayed. The user management 313 is a button for displaying a user management screen used by the administrator to manage users. The application use right management (user) 314 is a button for displaying a screen for managing applications that the users can use. The application use right management (device) 315 is a button for displaying a screen for managing applications that the electronic apparatuses 10 can use. The tenant information 316 is a button for displaying a screen for displaying contract (subscription) information of the tenant.

Confirming Other Login Methods

Even when a login screen for a login method stored in the browser information storage 26 is displayed, the user may want to check whether there is another login method (or other login methods) permitted by the tenant. For this reason, each of the login screens A2, B2, and C2 includes the "check other login method" button 432. A process performed when the "check other login method" button 432 is pressed is described below.

Figure 19:
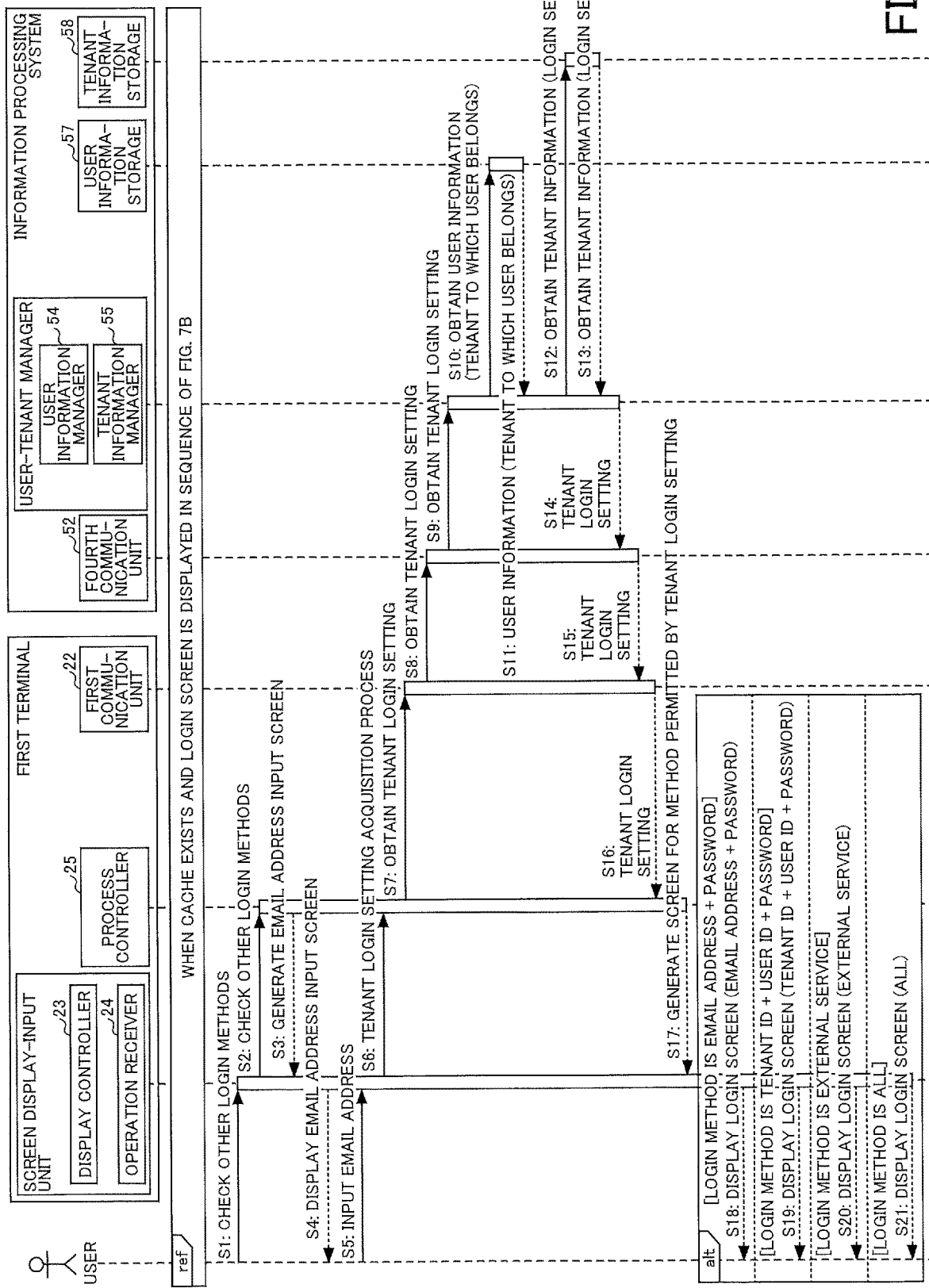
FIG. 19 is a sequence chart illustrating an example of a process performed when a "check other login method" button is pressed.

FIG. 19 is a sequence chart illustrating an example of a process performed by the first terminal 20 and the information processing system 50 when the "check other login method" button 432 is pressed. The process of FIG. 19 starts after a login screen is displayed at step S31, S33, or S35 in FIG. 7.

S1: The user presses the "check other login method" button 432 on the login screen A2, B2, or C2. The operation receiver 24 receives the pressing operation.

S2: The operation receiver 24 sends a request to check another login method (other login methods) to the process controller 25.

S3: Because the information processing system 50 needs to identify the user to identify the tenant, the process controller 25 requests the display controller 23 to display the email address input screen (FIG. 8).

S4: The display controller 23 displays the email address input screen 410.

S5: The user inputs an email address on the email address input screen 410. The operation receiver 24 receives the input.

S6: The operation receiver 24 sends a login setting acquisition request together with the email address to the process controller 25.

S7-S9: The process controller 25 sends the email address and the login setting acquisition request to the information processing system 50. The first communication unit 22 and the fourth communication unit 52 send the email address and the login setting acquisition request to the user information manager 54.

S10, S11: The user information manager 54 obtains user information identified based on the email address from the user information storage 57.

S12, S13: The user information manager 54 sends the user information to the tenant information manager 55, and the tenant information manager 55 searches the tenant information storage 58 with a tenant ID included in the user information. Thus, the tenant information manager 55 obtains tenant information of a tenant to which the user belongs.

S14-S16: The information processing system 50 sends a login setting included in the tenant information to the first terminal 20. The first communication unit 22 and the fourth communication unit 52 send the login setting of tenant to the process controller 25.

S17: The process controller 25 requests the display controller 23 to display a login screen corresponding to a login method permitted by the login setting of the tenant among the login screens obtained at step S8 of FIG. 7A.

S18: When the login method permitted by the tenant is "(A) Email address and password", the display controller 23 displays the login screen A1 (FIG. 9).

S19: When the login method permitted by the tenant is "(B) Tenant ID, user ID, and password", the display controller 23 displays the login screen B1 (FIG. 10).

S20: When the login method permitted by the tenant is "(C) Using external service", the display controller 23 displays the login screen C1 (FIG. 11).

S21: When the login method permitted by the tenant is "(D) All", the display controller 23 displays the login screen D1 (FIG. 12).

Thus, the user can check another login method (or other login methods) and can log in with a login method different from the login method stored in the browser information storage 26. The login method is stored in the browser information storage 26, and the login method for the next time can be changed.

In FIG. 19, it is assumed that one login method is displayed each time (FIGS. 9 through 11). However, when multiple login methods are permitted, the login screen F corresponding to multiple login methods is displayed as illustrated in FIG. 16.

Summary

As described above, in the computer system 1 of the present embodiment, once a login method is stored, the first terminal 20 or the second terminal 30 can display a login screen corresponding to the login method permitted by the tenant without requiring the user to input information such as an email address for identifying the user. Also, even when a service of an information processing system provides multiple selectable login methods for each tenant, to present an appropriate login screen to the user, it is necessary to identify a tenant to which the user belongs based on identification information of the user. However, with the present embodiment, once a login method is stored, the user does not have to enter identification information (e.g., an email address) of the user each time. Therefore, for example, when a service provided by the information processing system 50 is linked with an external service and allows the user to log in with user identification information for the external service, i.e., when identification information of the user for the service provided by the information processing system 50 is not necessary for login, the present embodiment can eliminate the need for the user to input the dentification information of the user for the service provided by the information processing system 50.

Second Embodiment

In the first embodiment, when a login method used by the user is not permitted by the login setting of the tenant, a login method permitted by the login setting of the tenant is stored in the browser information storage 26. Therefore, the login is allowed, and the login screen is changed from the next login. In the computer system 1 of a second embodiment, when a login method used by the user is not permitted by the login setting of the tenant, the information processing system 50 causes the user to log out and to log in with a login method permitted by the login setting of the tenant.

Here, it is assumed that the hardware configurations of FIGS. 3 and 4 and the functional configuration of FIG. 5 described in the first embodiment are applicable to the second embodiment.

Figure 20A:
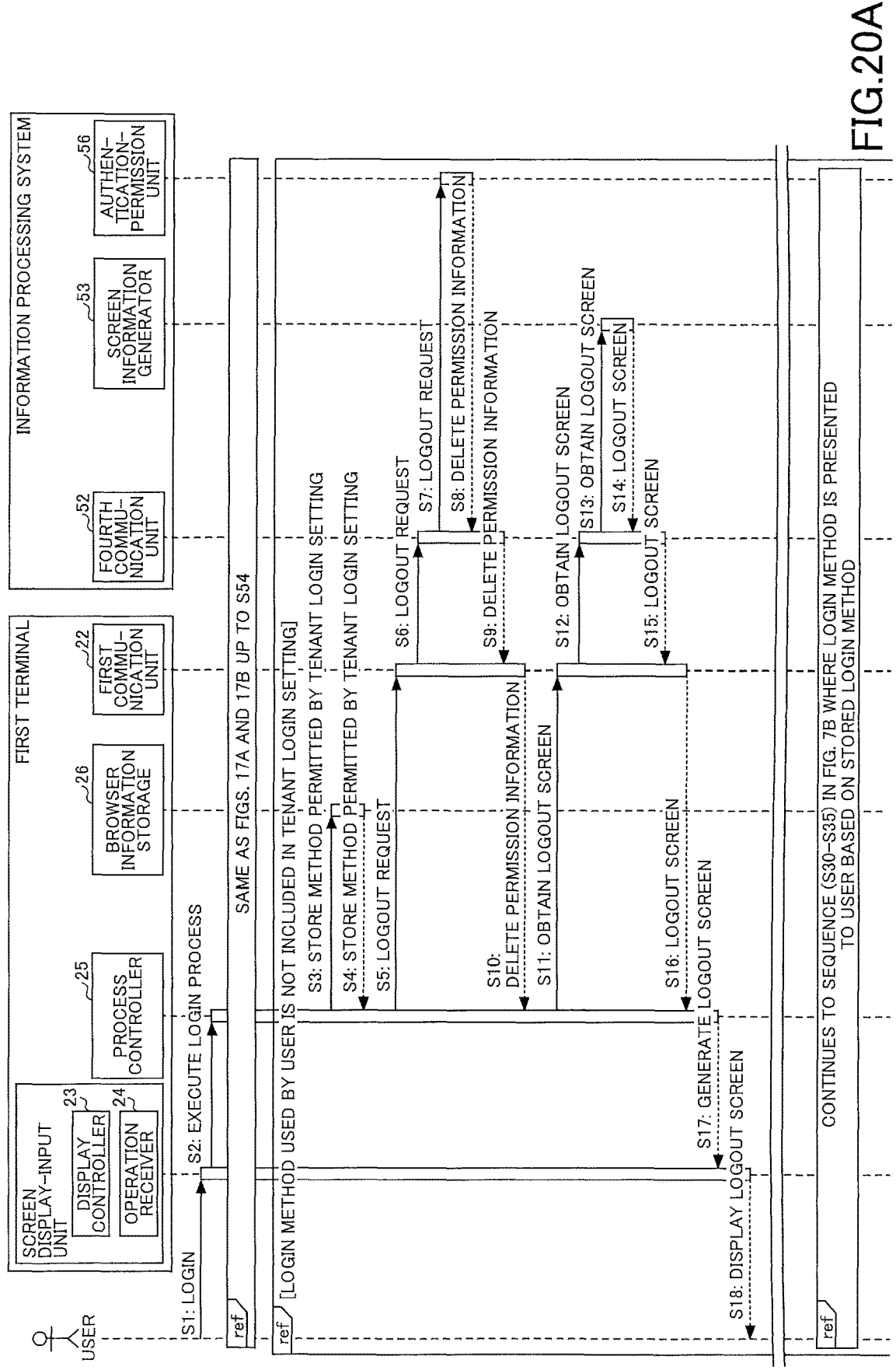
FIG. 20A is a sequence chart illustrating an example of a process performed by an information processing system.
Figure 20B:
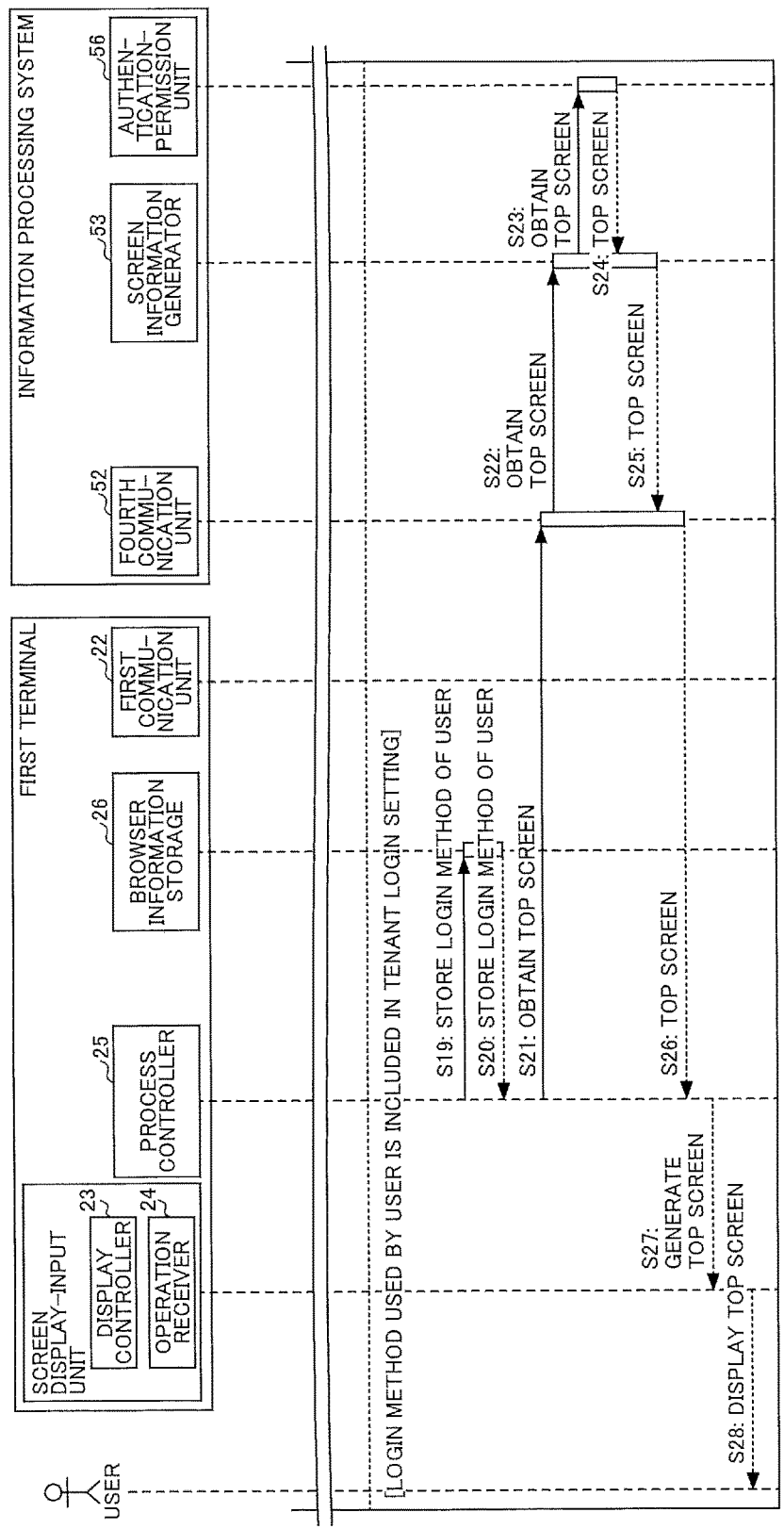
FIG. 20B is a sequence chart illustrating an example of a process performed by an information processing system.

Process where User is Logged Out when Login Method Used by User is not Permitted by Tenant Login Setting FIGS. 20A and 20B are sequence charts illustrating a process where the information processing system 50 causes the user to log out when a login method used by the user is not permitted by the login setting of the tenant and to log in with a login method permitted by the tenant.

S1 and S2: The user logs in. After step S2 and before step S3, steps up to step S54 of FIGS. 17A and 17B are performed. The process described below is performed in place of steps S55 through S58 of FIG. 17B.

S3, S4: When determining that the login method used by the user is not permitted by the login setting of the tenant, the process controller 25 stores a login method permitted by the login setting of the tenant in the browser information storage 26.

S5-S7: The process controller 25 sends a logout process request together with user identification information (for example, an email address, a tenant ID and a user ID, or a token) to the information processing system 50. The first communication unit 22 and the fourth communication unit 52 send the logout process request to the authentication-permission unit 56. The authentication-permission unit 56 causes the user identified by the user identification information to log out. That is, the authentication-permission unit 56 deletes permission information given to the user.

S8-S10: The authentication-permission unit 56 sends information indicating that the permission information has been deleted to the first terminal 20. The first communication unit 22 and the fourth communication unit 52 send the information indicating that the permission information has been deleted to the process controller 25.

S11-S16: The process controller 25 sends a request for a logout screen to the information processing system 50 and obtains screen information of the logout screen to report to the user that the user has been logged out.

Figure 21:
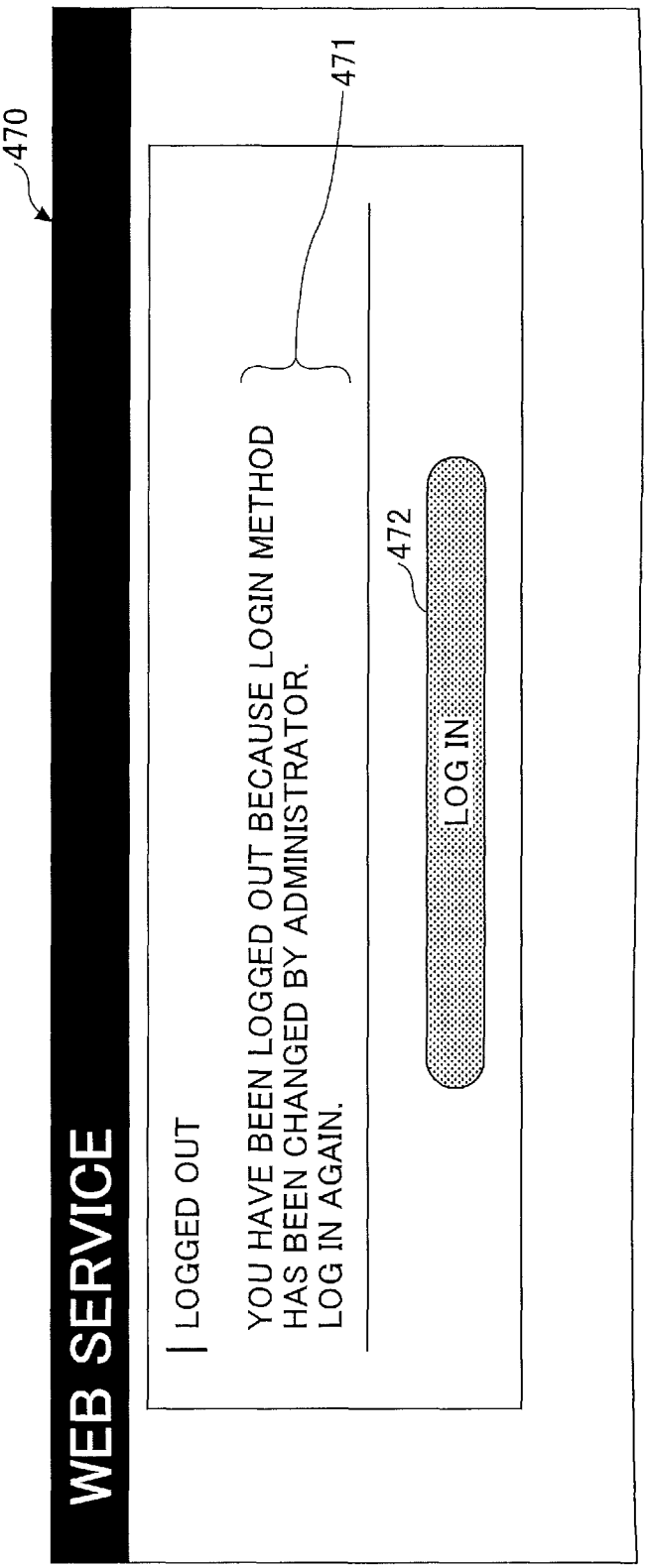
FIG. 21 is a drawing illustrating an example of a logout screen.

S17, S18: The process controller 25 sends the screen information of the logout screen to the display controller 23, and the display controller 23 displays the logout screen. FIG. 21 illustrates an example of the logout screen. The logout screen enables the user to know that the user has been logged out. Also, because the logout screen prompts the user to log in again with a login method permitted by the tenant, the user can log in with the login method permitted by the tenant.

When the user presses a "log in" button on the logout screen of FIG. 21, a process substantially the same as steps S25 and S30-S35 of FIGS. 7A and 7B is performed. On a newly displayed login screen, the user logs in again with the login method permitted by the tenant. Thus, when the user logs in with a login method not permitted by the tenant, the information processing system 50 can cause the user to log out.

The process (steps S19 through S28) performed when the login method used by the user is permitted by the login setting of the tenant may be the same as steps S57 through S66 of FIG. 17B.

FIG. 21 is a drawing illustrating an example of a logout screen 470. The logout screen 470 displays a message 471 "YOU HAVE BEEN LOGGED OUT BECAUSE LOGIN METHOD HAS BEEN CHANGED BY ADMINISTRATOR. LOG IN AGAIN". When the user presses a "log in" button 472, the logout screen 470 is switched to a login screen.

Summary

As described above, in the second embodiment, when the login method used by the user is not permitted by the login setting of the tenant, the information processing system 50 causes the user to log out. This makes it possible to strictly apply the login setting of the tenant and let the user log in with a login method permitted by the tenant.

Third Embodiment

Because the administrator of a tenant can change the login setting of the tenant, only the administrator may be allowed to log in using various login methods regardless of the login setting of the tenant. In a computer system of a third embodiment, when the administrator logs in, all login screens that can be set by the administrator in the information processing system 50 are displayed.

Here, it is assumed that the hardware configurations of FIGS. 3 and 4 and the functional configuration of FIG. 5 described in the first embodiment are applicable to the third embodiment.

Process for Displaying Login Screen Based on User Role

FIG. 22 is a sequence chart illustrating an example of a process in which the first terminal 20 changes a login screen to be displayed according to the login setting of the tenant and the role of the user.

S1-S13: These steps may be the same as steps S1 through S13 in FIG. 7A.

S14-S24: When no login method is stored in the browser information storage 26, the process controller 25 sends a request for a login setting and a user role to the information processing system 50 together with an email address entered by the user. This process is similar to steps S14 through S24 of FIG. 7A except that the user role is also obtained. The user information manager 54 obtains the role of the user identified based on the email address from the user information storage 57. The login setting of the tenant and the role of the user are sent to the process controller 25.

S25: The process controller 25 determines a login screen according to the login method permitted in the login setting and the role of the user.

User Role is Administrator

The process controller 25 determines to display a login screen corresponding to all login methods that can be set by the administrator in the information processing system 50. All login methods that can be set by the administrator in the information processing system 50 correspond to the login method "(D) All".

User Role is General User

The process controller 25 determines to display a login screen corresponding to a login method permitted by the login setting.

Figure 23:
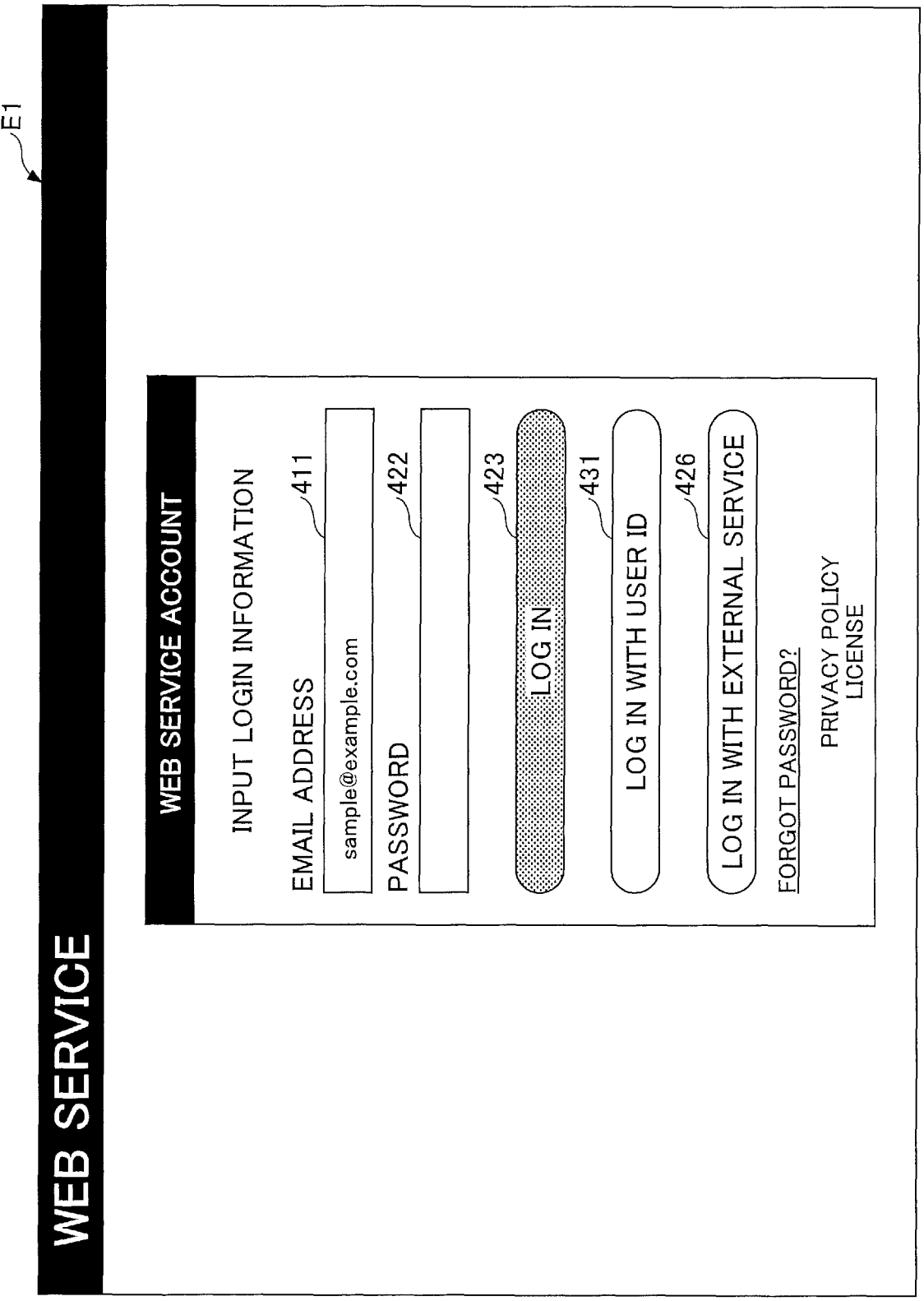
FIG. 23 is a drawing illustrating an example of a login screen E1.

S26: When the role of the user is an administrator, the display controller 23 displays a login screen E1 corresponding to all login methods. FIG. 23 illustrates an example of the login screen E1.

S27-S36: These steps are the same as steps S26 through S35 of FIG. 7B.

Figure 22A:
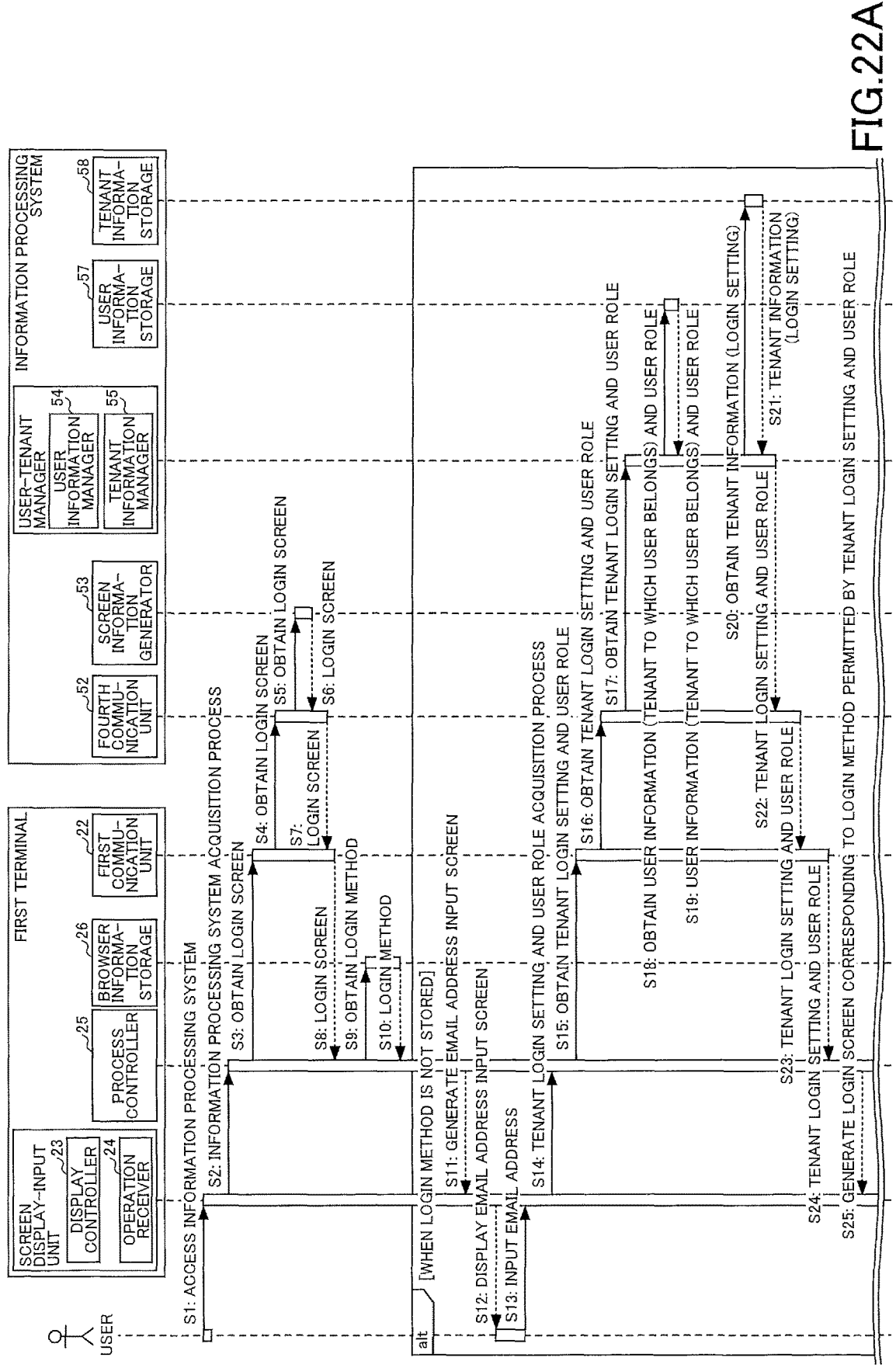
FIG. 22A is a sequence chart illustrating an example of a process where a login screen is changed according to a tenant login setting and a user role.
Figure 22B:
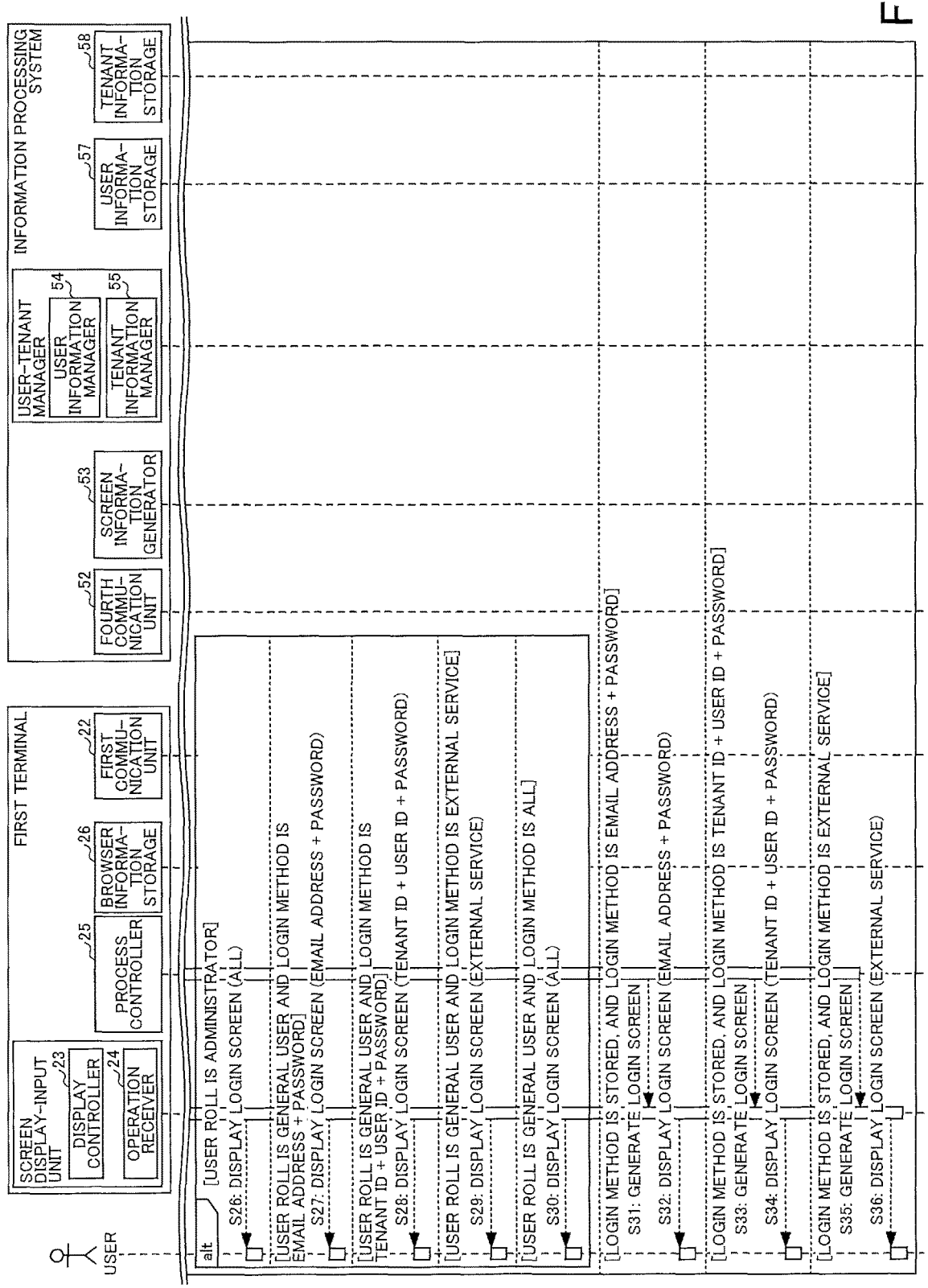
FIG. 22B is a sequence chart illustrating an example of a process where a login screen is changed according to a tenant login setting and a user role.

In FIGS. 22A and 22B, one login screen is displayed for each login method (FIGS. 9 through 11). However, when multiple login methods are permitted, the login screen F corresponding to the multiple login methods is displayed as illustrated in FIG. 16.

Login Screen Displayed by Second Terminal of Administrator

FIG. 23 illustrates an example of the login screen E1. The login screen E1 corresponds to all login methods and is therefore similar to the login screen D1 of FIG. 12. Thus, the administrator can login with a preferred login method.

Checking Other Login Methods

Also in the third embodiment, the user can check whether there is another login method (or other login methods) permitted by the tenant. That is, when the user role is an administrator, the second terminal 30 can display the login screen E1.

Figure 24:
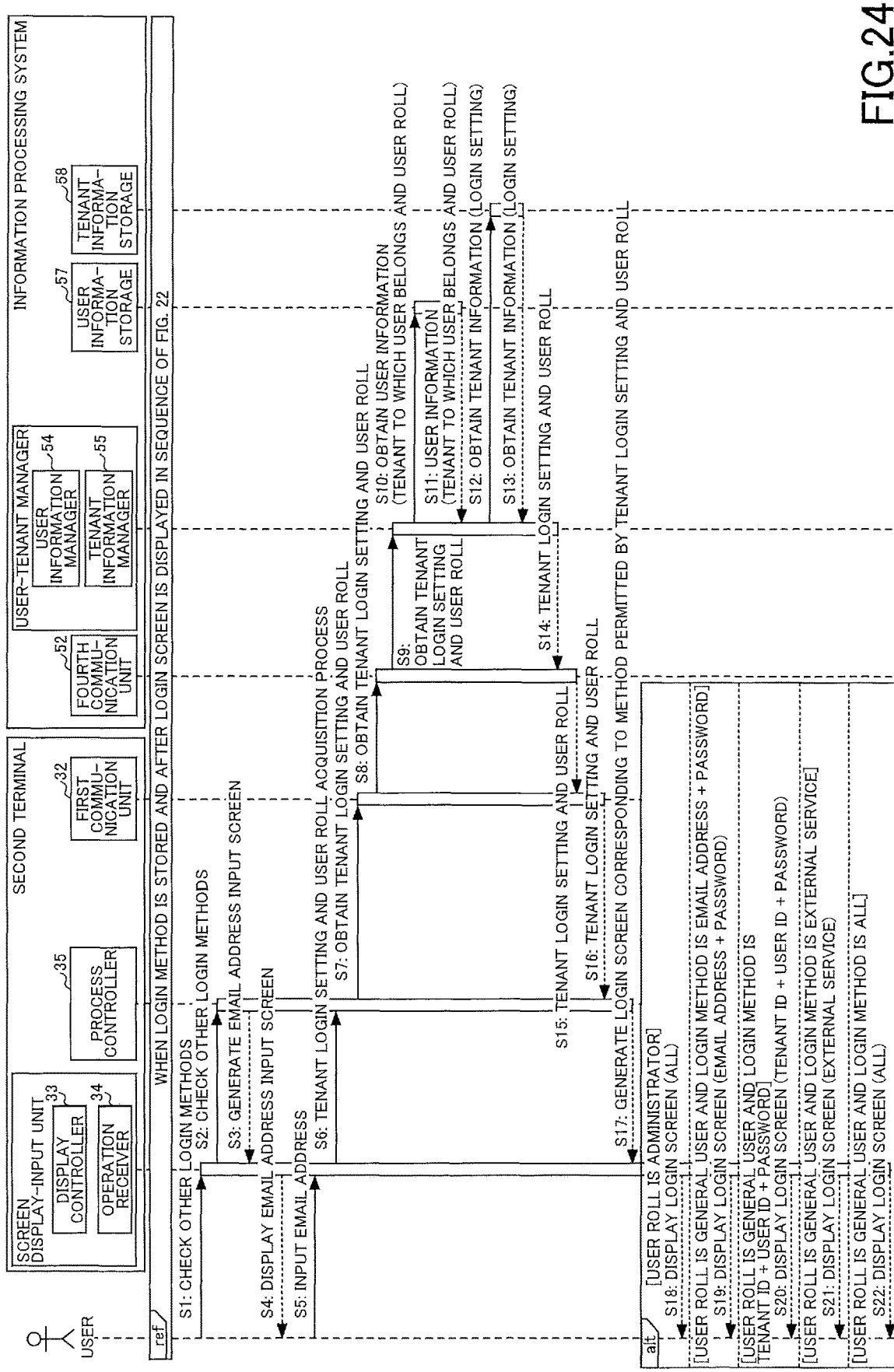
FIG. 24 is a sequence chart illustrating an example of a process performed when a "check other login method" button is pressed.

FIG. 24 is a sequence chart illustrating an example of a process performed by the second terminal 30 and the information processing system 50 when the "check other login method" button 432 is pressed. Below, differences between FIG. 24 and FIG. 19 are mainly described. The user presses the "check other login method" button 432 on the login screen A2, B2, or C2.

S1-S16: These steps are substantially the same as steps S1 through S16 of FIG. 19 except that the role of the user is sent to the second terminal 30. The user information manager 54 obtains the role of the user identified based on the email address from the user information storage 57. The login setting of the tenant and the role of the user are sent to the process controller 35.

S17: The process controller 35 determines a login screen according to the login method permitted by the login setting and the role of the user.

User Role is Administrator

The process controller 35 determines to display a login screen corresponding to all login methods that can be set by the administrator in the information processing system 50.

User Role is General User

The process controller 35 determines to display a login screen corresponding to a login method permitted by the login setting.

S18: When the role of the user is an administrator, the display controller 33 displays the login screen E1 (FIG. 23) corresponding to all login methods.

S19-S22: These steps are substantially the same as steps S18 through S21 of FIG. 19.

Storing Login Methods when User Role is Administrator

When the role of the user is an administrator, the process controller 35 may store all login methods. Once all login methods have been stored, the administrator can log in from the login screen E1 corresponding to all login methods without entering the email address.

Figure 25A:
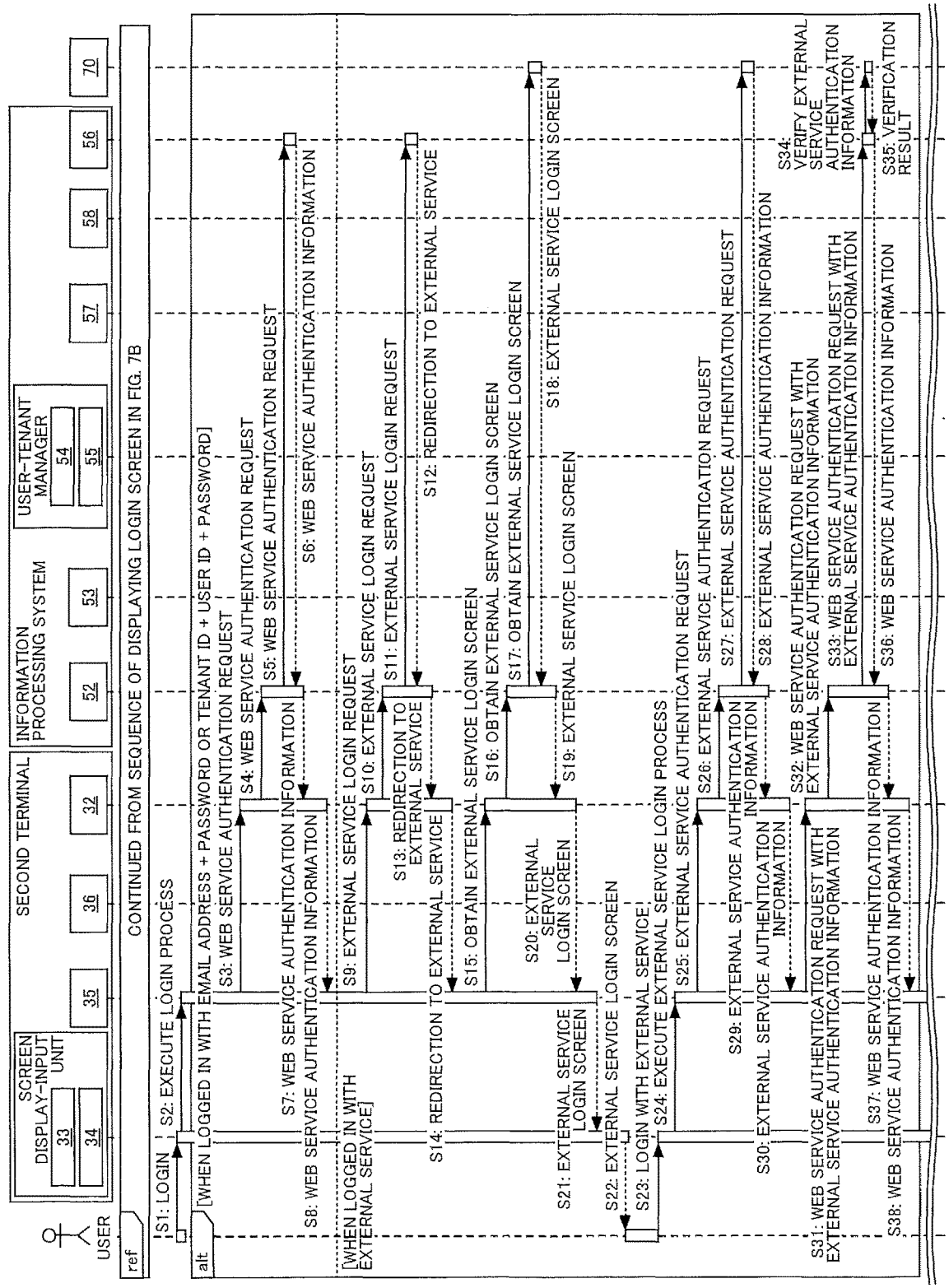
FIG. 25A is a sequence chart illustrating an example of a process where all login methods are stored when a logged-in user is an administrator.
Figure 25B:
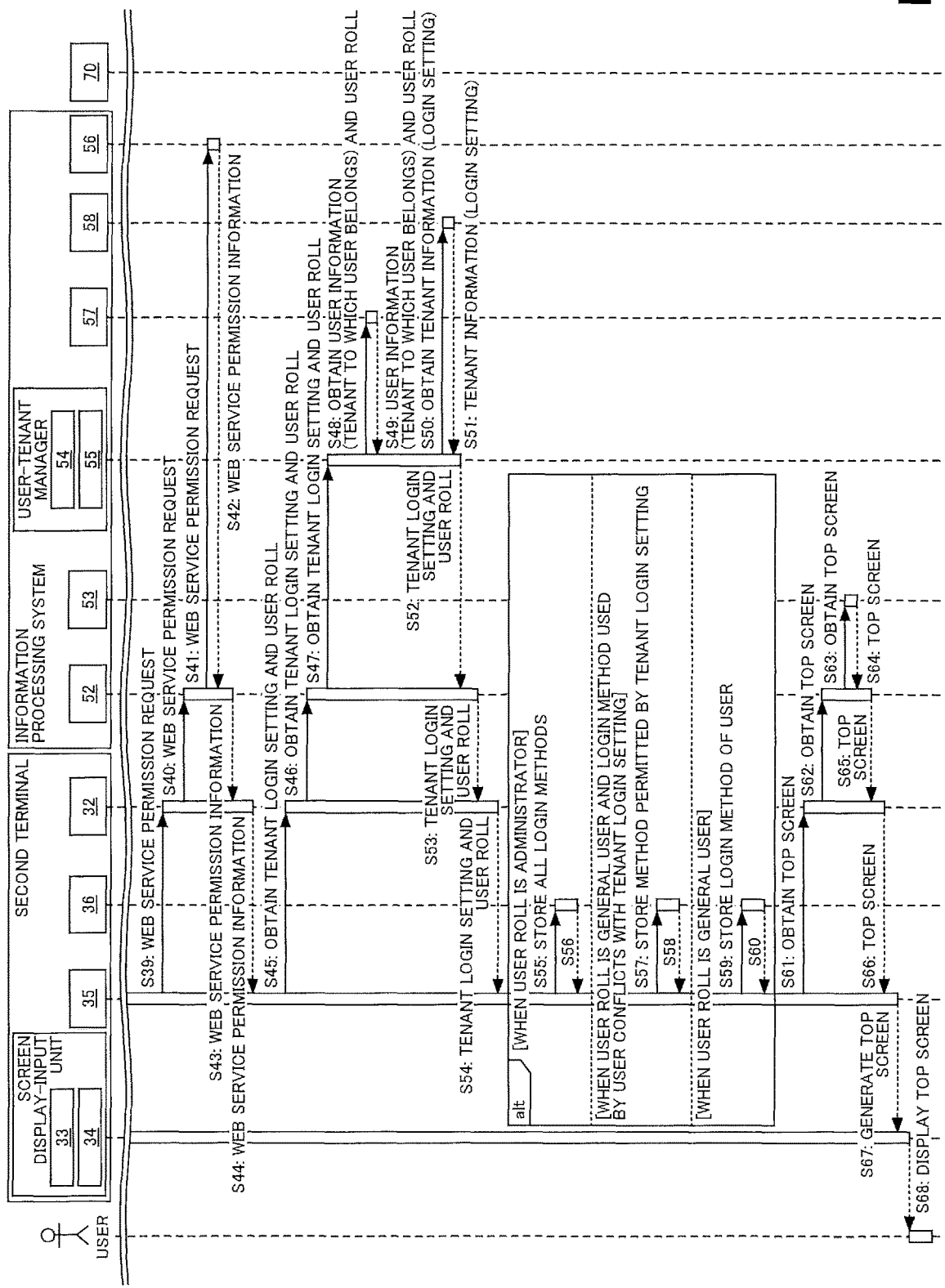
FIG. 25B is a sequence chart illustrating an example of a process where all login methods are stored when a logged-in user is an administrator.

FIGS. 25A and 25B are sequence charts illustrating an example of a process where the second terminal 30 stores all login methods when the logged-in user is the administrator.

Steps S1 through S44 are substantially the same as steps S1 through S44 of FIGS. 17A and 17B. Also, steps S45 through S53 are substantially the same as steps S6 through S16 of FIG. 24.

S54: The process controller 35 receives the login setting of the tenant and the role of the user.

S55, S56: When the role of the user is an administrator, the process controller 35 stores all login methods that can be set by the administrator in the browser information storage 36 regardless of the login setting of the tenant.

S57, S58: When the role of the user is a general user and the login setting used by the user is not included in the login setting permitted by the tenant, the process controller 35 stores a login method permitted by the tenant in the browser information storage 36.

S59,S60: When the role of the user is a general user and the login setting used by the user is included in the login setting permitted by the tenant, the process controller 35 stores the login method used by the user in the browser information storage 36.

Steps S61 through S67 may be substantially the same as steps S59 through S66 of FIG. 17B.

Thus, when the user is an administrator and all login methods are stored, the administrator can log in from the login screen E1 corresponding to all login methods without entering the email address.

Summary

The third embodiment makes it possible to display all login screens when the administrator logs in and thereby makes it possible to improve the operability by the administrator.

Fourth Embodiment

There is a case where the user logs in with a login method that is stored in the browser information storage 26 but is not permitted by the login setting of the tenant. In this case, the login method permitted by the login setting of the tenant is stored in the browser information storage 26. However, the user may not have registered account information used for the login setting of the tenant. For example, there is a case where the user logged in using the external service 70, this login method becomes not permitted by the login setting of the tenant, a password is necessary for another login method, but no password is registered in the user information. In another example, the user logged in with a login method using a password, this login method becomes not permitted by the login setting of the tenant, a linkage with the external service 70 is necessary for another login method, but the external service 70 is not registered in the user information.

A fourth embodiment describes a computer system 1 where the user can add account information necessary for a login method permitted by the login setting of the tenant.

Here, it is assumed that the hardware configurations of FIGS. 3 and 4 and the functional configuration of FIG. 5 described in the first embodiment are applicable to the fourth embodiment.

Figure 26A:
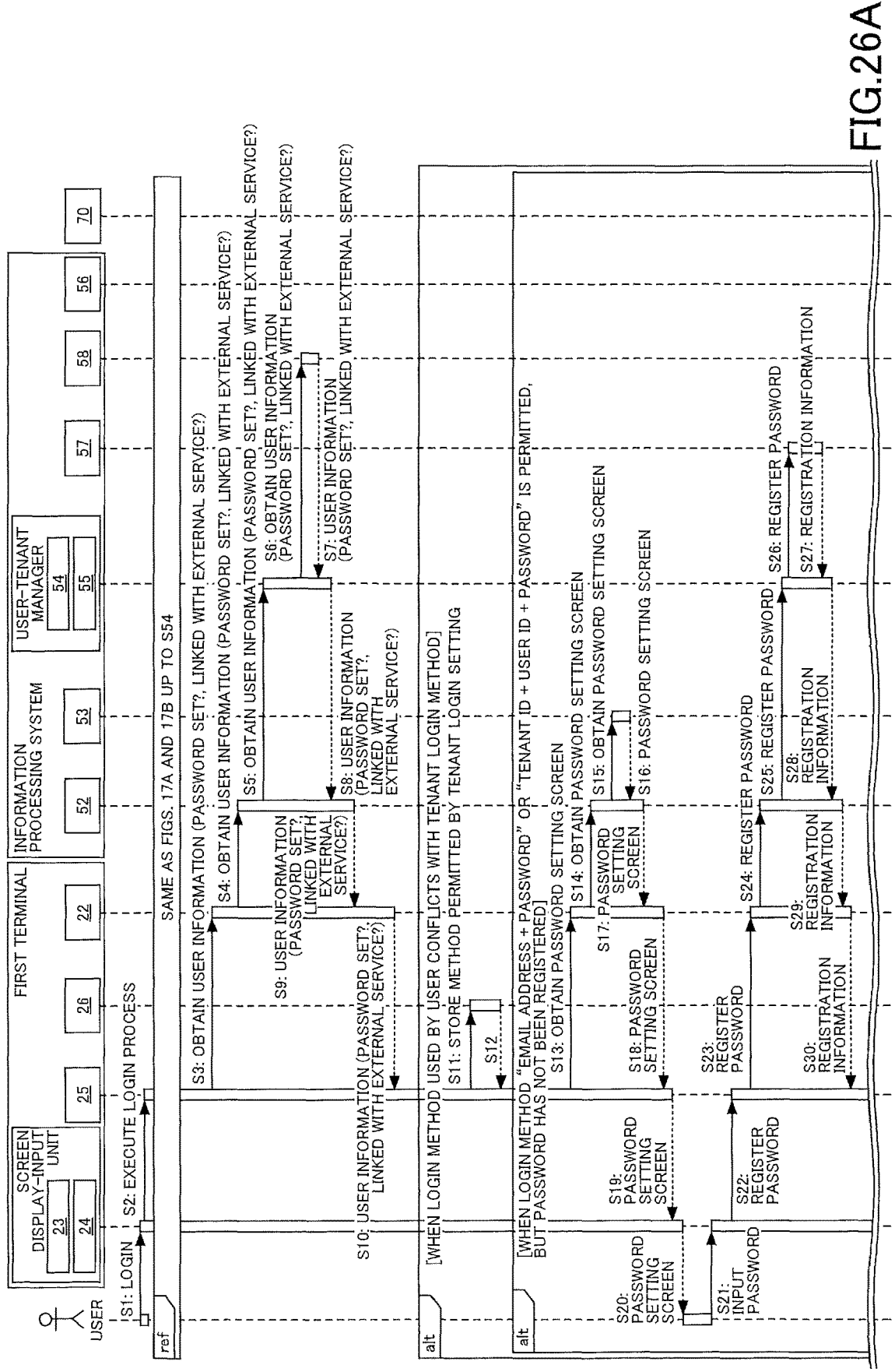
FIG. 26A is a sequence chart illustrating an example of a process where a user adds account information necessary for a login method permitted by a tenant login setting.
Figure 26B:
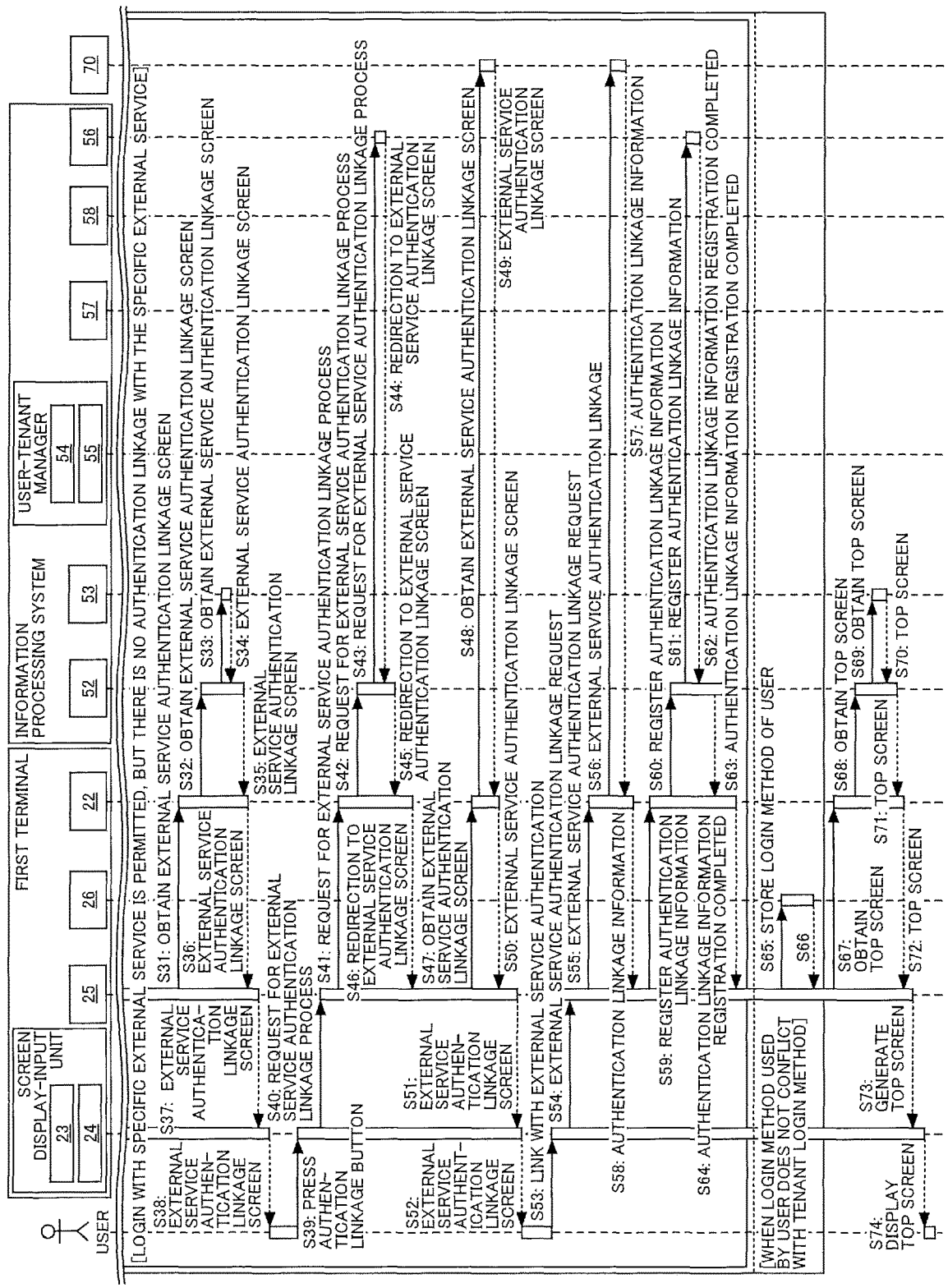
FIG. 26B is a sequence chart illustrating an example of a process where a user adds account information necessary for a login method permitted by a tenant login setting.

Process of Adding Account Information Necessary for Login Method Permitted by Login Setting of Tenant FIGS. 26A and 26B are sequence charts illustrating an example of a process where the user adds account information necessary for a login method permitted by the login setting of the tenant when the user logged in with a login method that is stored in the browser information storage 26 but is not permitted by the login setting of the tenant.

S1, S2: The user logs in. After step S2 and before step S3, steps up to step S54 of FIGS. 17A and 17B are performed.

S3-S5: The process controller 25 sends a request for user information to the information processing system 50 together with user identification information (an email address, a tenant ID and a user ID, or a token). This is to determine whether a password has been set and whether the user is linked with the external service 70. The first communication unit 22 and the fourth communication unit 52 send the request for user information to the user information manager 54.

S6, S7: The user information manager 54 obtains user information identified based on the user identification information from the user information storage 57.

S8-S10: The user information manager 54 sends the user information to the first terminal 20. The first communication unit 22 and the fourth communication unit 52 send the user information to the process controller 25.

The process described below is performed in place of steps S55 through S58 of FIG. 17B.

S11, S12: When determining that the login method used by the user is not permitted by the login setting of the tenant, the process controller 25 stores a login method permitted by the login setting of the tenant in the browser information storage 26.

Steps S13 through S30 are performed when the login method "(A) Email address and password" or "(B) Tenant ID, user ID, and password" is permitted but no password is registered.

S13-S18: The process controller 25 sends a request for a password setting screen to the information processing system 50. The first communication unit 22 and the fourth communication unit 52 send the request for a password setting screen to the screen information generator 53. The screen information generator 53 generates screen information of the password setting screen and sends the screen information to the first terminal 20. The first communication unit 22 and the fourth communication unit 52 send the screen information of the password setting screen to the process controller 25.

S19: The process controller 25 sends the screen information of the password setting screen to the display controller 23.

S20: The display controller 23 displays the password setting screen. FIG. 27 illustrates an example of the password setting screen.

S21: The user inputs a password. The operation receiver 24 receives the input password.

S22: The operation receiver 24 requests the process controller 25 to register the password.

S23-S26: The process controller 25 sends a password registration request to the information processing system 50 together with user identification information. The first communication unit 22 and the fourth communication unit 52 send the password registration request to the user information manager 54. The user information manager 54 identifies the user with the user identification information (an email address, a tenant ID and a user ID, or a token), and registers the password in the user information.

S27-S30: The user information manager 54 sends a password registration completion report to the first terminal 20. The first communication unit 22 and the fourth communication unit 52 send the password registration completion report to the process controller 25.

Steps S31 through S64 are performed when the login method "(C) Using external service" is permitted but the external service 70 is not registered.

S31-S33: The process controller 25 sends a request for an external service authentication linkage screen to the information processing system 50. The request for the external service authentication linkage screen is transmitted to the screen information generator 53 via the first communication unit 22 and the fourth communication unit 52.

S34-S36: The screen information generator 53 generates screen information of the external service authentication linkage screen and sends the screen information to the first terminal 20. The screen information of the external service authentication linkage screen is transmitted to the process controller 25 via the first communication unit 22 and the fourth communication unit 52.

S37: The process controller 25 sends the screen information of the external service authentication linkage screen to the display controller 23.

Figure 28:
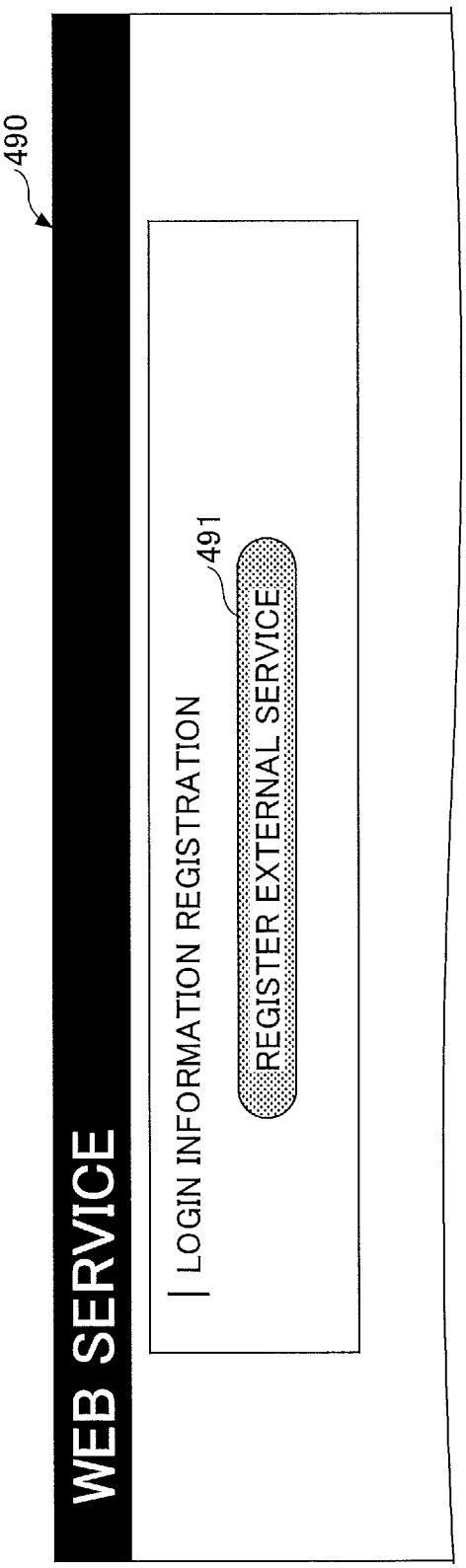
FIG. 28 is a drawing illustrating an example of an external service authentication linkage screen.

S38: The display controller 23 displays the external service authentication linkage screen. FIG. 28 illustrates an example of the external service authentication linkage screen.

S39: The user presses an authentication linkage button ("Register external service"). The operation receiver 24 receives the pressing operation.

S40: The operation receiver 24 sends information indicating that the authentication linkage button is pressed, to the process controller 25.

S41-S43: The process controller 25 requests the information processing system 50 to perform an external service authentication linkage process. The request for the external service authentication linkage process is transmitted to the authentication-permission unit 56 via the first communication unit 22 and the fourth communication unit 52.

S44-S46: Upon receiving the request for the external service authentication linkage process, the authentication-permission unit 56 sends a redirection request for redirection to the external service 70 to the first terminal 20 together with a known URL of the authentication linkage screen of the external service 70. The URL of the authentication linkage screen of the external service 70 and the redirection request to the external service 70 are sent to the process controller 25 via the first communication unit 22 and the fourth communication unit 52. Here, the authentication-permission unit 56 sends a ticket for identifying the user to the first terminal 20.

S47-S50: The process controller 25 is redirected to the authentication linkage screen of the external service 70 based on the URL of the authentication linkage screen of the external service 70. That is, the process controller 25 is redirected to the external service 70 and obtains screen information of the authentication linkage screen of the external service 70.

S51, S52: The process controller 25 sends the screen information of the authentication linkage screen of the external service 70 to the display controller 23, and the display controller 23 displays the authentication linkage screen of the external service 70.

S53: The user activates authentication linkage with the external service 70 on the authentication linkage screen of the external service 70. The operation receiver 24 receives the operation. In general, in a site such as the external service 70 that requires login, account information is stored using a technology such as a cookie, and the user does not need to input account information to the external service 70.

Therefore, when the user uses the external service 70, the user only needs to press the external service login button 426.

S54-S56: The operation receiver 24 sends the account information stored using, for example, a cookie, an authentication request, a ticket, and a request to activate the authentication linkage with the external service 70 to the external service 70 via the process controller 25, the first communication unit 22, and the fourth communication unit 52. The external service 70 authenticates the user and when the authentication is successful, enables the authentication linkage for the user identified by user identification information.

S57, S58: The external service 70 sends information indicating that the authentication linkage has been activated to the first terminal 20.

S59-S61: The process controller 25 sends an authentication linkage registration request together with the ticket to the information processing system 50. The ticket and the authentication linkage registration request are transmitted to the authentication-permission unit 56 via the first communication unit 22 and the fourth communication unit 52.

S62-S64: The authentication-permission unit 56 activates the authentication linkage for the user identified by the ticket and sends an authentication linkage information registration completion report (which indicates that the authentication linkage has been set) to the first terminal 20. The authentication linkage information registration completion report is transmitted to the process controller 25 via the first communication unit 22 and the fourth communication unit 52.

Steps S65 through S74 may be substantially the same as steps S57 through S66 of FIG. 17B.

Password Setting Screen

FIG. 27 is an example of a password setting screen 480. The password setting screen 480 includes a password setting field 481 and a password confirmation field 482. The process controller 25 checks the number and the type of characters constituting a password and accepts the setting of the password when the password in the password setting field 481 and the password in the password confirmation field 482 are the same.

External Service Authentication Linkage Screen

FIG. 28 is an example of an external service authentication linkage screen 490. The external service authentication linkage screen 490 includes an authentication linkage button ("Register External Service") 491. The authentication linkage button 491 activates authentication linkage with the external service 70.

Summary

As described above, in the computer system 1 of the fourth embodiment, when the user logged in using a login method that is stored in the browser information storage 26 but is not permitted by the login setting of the tenant, the user can add account information necessary for a login method permitted by the login setting of the tenant.

Other Applications

A computer system, a login screen display method, and a storage medium according to embodiments of the present invention are described above. However, the present invention is not limited to the specifically disclosed embodiments, and variations and modifications may be made without departing from the scope of the present invention.

The configurations illustrated in FIG. 5 are represented by process units or functional blocks to facilitate the understanding of processes performed by the first terminal 20, the second terminal 30, the electronic apparatus 10, and the information processing system 50. However, the present invention is not limited by a manner in which each apparatus is divided, into process units and the names of the process units. The process units of each of the first terminal 20, the second terminal 30, the electronic apparatus 10, and the information processing system 50 may be further divided into a greater number of process units depending on processes to be performed. Also, each apparatus may be divided into process units such that each process unit includes a greater number of processes.

Also, the apparatuses described above merely indicate one of multiple computing environments for implementing the embodiments described in the present application. In an embodiment, the information processing system 50 may include multiple computing devices such as server clusters. The multiple computing devices may be configured to communicate with each other via a communication link such as a network or a shared memory and perform processes disclosed in the present application.

Further, the information processing system 50 may be configured to share the steps illustrated in, for example, FIGS. 7A and 7B, FIGS. 17A and 17B, FIG. 19, FIGS. 20A and 20B, FIGS. 22A and 22B, FIG. 24, FIGS. 25A and 25B, and FIGS. 26A and 26B in various combinations. For example, a process executed by a given unit may be executed by multiple information processing apparatuses included in the information processing system 50. The information processing system 50 may be implemented by one server or may be implemented by multiple apparatuses.

Each of the functional components described in the above embodiments may be implemented by one or more processing circuits. In the present application, the term "processing circuit" may indicate a processor that is implemented by an electronic circuit and programmed by software to implement various functions, or a device such as an application specific integrated circuit (ASIC), a digital signal processor (DSP), a field programmable gate array (FPGA), or a circuit module designed to implement various functions described above.

An aspect of this disclosure makes it possible to provide a computer system that can display an appropriate login screen without identifying a user.

What is claimed is:

1. A computer system, comprising:
an information processing system configured to authenticate a user using one of multiple login methods, and
a terminal configured to request the information processing system to authenticate the user,
wherein the terminal includes a processor programmed to
store a flag indicating a type of a previously-used login method from among the multiple login methods in an information storage, the flag taking one of multiple values corresponding to the multiple login methods,
determine, based on the flag, whether to obtain information on a login setting from the information processing system, or to log in using a login method indicated by a value of the flag,
display, upon determining to log in using the login method indicated by the value of the flag, a login screen including an item that enables the user to input account information necessary for the login method corresponding to the value of the flag, and
display, upon determining to obtain the information on the login setting from the information processing system, a login screen including an item that enables the user to input account information necessary for a login method corresponding to the information on the login setting obtained from the information processing system.

2. The computer system as claimed in claim 1, wherein the user belongs to a tenant to which a service is provided, and one or more login methods permitted by the tenant are registered in the tenant;
the information processing system includes a processor programmed to
identify the tenant to which the user belongs based on identification information of the user sent from the terminal, and
obtain the one or more login methods permitted by the identified tenant, and
the processor of the terminal is programmed to
obtain, from the information processing system, screen information of login screens corresponding to the one or more login methods permitted by the tenant to which the user belongs, and
display the login screen corresponding to the determined login method among the login screens obtained from the information processing system.

3. The computer system as claimed in claim 1, wherein the processor of the terminal is programmed to
obtain, from the information processing system, one or more login methods permitted by a tenant to which the user belongs,
obtain, from the information processing system, the login setting when the flag indicating the type of the previously-used login method is not stored in the information storage, and
display, based on the login setting, the login screen corresponding to the login method obtained from the information processing system when the flag indicating the type of the previously-used login method is not stored in the information storage.

4. The computer system as claimed in claim 3, wherein when the flag indicating the type of the previously-used login method is not stored in the information storage and the one or more login methods obtained from the information processing system include multiple login methods, the processor of the terminal is programmed to display a login screen that enables the user to log in using the multiple login methods.

5. The computer system as claimed in claim 3, wherein when the flag indicating the type of the previously-used login method is not stored in the information storage, the processor of the terminal is programmed to
obtain a role of the user from the information processing system based on identification information of the user, and
determine the login screen according to the role of the user.

6. The computer system as claimed in claim 5, wherein when the role of the user is an administrator, the processor of the terminal is programmed to store, in the information storage, flags indicating types of all login methods that are settable in the information processing system.

7. The computer system as claimed in claim 5, wherein when the role of the user is an administrator, the processor of the terminal is programmed to
determine all login methods settable in the information processing system as login methods to be provided to the user, and
display a login screen that enables the user to log in using all of the login methods settable in the information processing system.

8. The computer system as claimed in claim 3, wherein the processor of the terminal is programmed to
display the login screen that allows the user to select a login method from among the one or more login methods permitted by the tenant to which the user belongs obtained from the information processing system.

9. The computer system as claimed in claim 1, wherein the processor of the terminal is programmed to
execute a login process using the login method based on the flag,
obtain, from the information processing system, one or more login methods permitted by a tenant to which the user belongs, and
store when the login method based on the flag is not included in the one or more login methods obtained from the information processing system, the one or more login methods obtained from the information processing system in the information storage.

10. The computer system as claimed in claim 1, wherein the processor of the terminal is programmed to
execute a login process using the login method based on the flag,
obtain, from the information processing system, one or more login methods permitted by a tenant to which the user belongs,
request, when the login method based on the flag is not included in the one or more login methods obtained from the information processing system, the information processing system to log out the user who has logged in, and
display a login screen corresponding to the one or more login methods stored in the information storage.

11. The computer system as claimed in claim 9, wherein when the login method used by the user on the login screen is not included in the one or more login methods obtained from the information processing system, the flag indicating the type of the one or more login methods obtained from the information processing system is stored in the information storage, and account information necessary for the one or more login methods indicated by the flag stored in the information storage is not registered in the information processing system,
the processor of the terminal is programmed to
display a screen for receiving an input of the account information necessary for the one or more login methods, and
register, in the information processing system, the account information that is input on the screen and necessary for the one or more login methods.

12. The computer system as claimed in claim 1, wherein the processor of the terminal is programmed to
execute a login process using the login method based on the flag,
obtain, from the information processing system, one or more login methods permitted by a tenant to which the user belongs, and
store, when the login method based on the flag is included in the one or more login methods obtained from the information processing system, the login method based on the flag and used by the user in the information storage.

13. The computer system as claimed in claim 1, wherein the processor of the terminal is programmed to
receive input information from the user when the previously-used login method is not stored in the information storage,
obtain a login setting corresponding to the input information, and
display, based on the login setting, the login screen corresponding to the login method, obtained from the information processing system.

14. The computer system as claimed in claim 13, wherein the processor of the terminal is programmed to
display, when the login method set based on the login setting is a login method based on first account information and second account information, a login screen that eliminates a need to enter the first account information based on the input information received before obtaining the login setting.

15. The computer system as claimed in claim 1, wherein the flag stores only the login method used last time from among login methods previously used by the user.

16. The computer system as claimed in claim 1, wherein the processor of the terminal is programmed to
display the login screen including the item that enables the user to input the account information necessary for the login method corresponding to the value of the flag, wherein the account information is a type of information that varies from login method to login method.

17. A method performed by a computer system including an information processing system and a terminal, the method comprising:
storing, by the terminal, a flag indicating a type of a previously-used login method from among the multiple login methods in an information storage; the flag taking one of multiple values corresponding to the multiple login methods;
determining, by the terminal, based on the flag, whether to obtain information on a login setting from the information processing system, or to log in using a login method indicated by a value of the flag;
displaying, by the terminal, upon determining to log in using the login method indicated by the value of the flag, a login screen including an item that enables the user to input account information necessary for the login method corresponding to the value of the flag;
displaying, by the terminal, upon determining to obtain the information on the login setting from the information processing system, a login screen including an item that enables the user to input account information necessary for a login method corresponding to the information on the login setting obtained from the information processing system, and
requesting the information processing system, by the terminal, to authenticate the user using the determined login method.

18. A non-transitory computer-readable storage medium storing a program for causing a terminal to perform a process, the process comprising:
storing a flag indicating a type of a previously-used login method from among the multiple login methods in an information storage; the flag taking one of multiple values corresponding to the multiple login methods;

determining, based on the flag, whether to obtain information on a login setting from the information processing system, or to log in using a login method indicated by a value of the flag;

displaying, upon determining to log in using the login method indicated by the value of the flag, a login screen including an item that enables the user to input account information necessary for the login method corresponding to the value of the flag;

displaying, upon determining to obtain the information on the login setting from the information processing system, a login screen including an item that enables the user to input account information necessary for a login method corresponding to the information on the login setting obtained from the information processing system, and requesting an information processing system to authenticate the user using the determined login method.

* * * * *